Aug. 28, 1951 B. C. GOLDEN 2,565,495
BAG STRINGING MECHANISM
Filed Dec. 19, 1947 17 Sheets-Sheet 2

Inventor
Bertie C. Golden,
Munson H. Lane
Attorney

Aug. 28, 1951     B. C. GOLDEN     2,565,495

BAG STRINGING MECHANISM

Filed Dec. 19, 1947     17 Sheets-Sheet 5

Aug. 28, 1951    B. C. GOLDEN    2,565,495
BAG STRINGING MECHANISM
Filed Dec. 19, 1947    17 Sheets-Sheet 8

Inventor
Bertie C. Golden,
Munson H. Lane
Attorney

Aug. 28, 1951     B. C. GOLDEN     2,565,495
BAG STRINGING MECHANISM
Filed Dec. 19, 1947     17 Sheets-Sheet 9
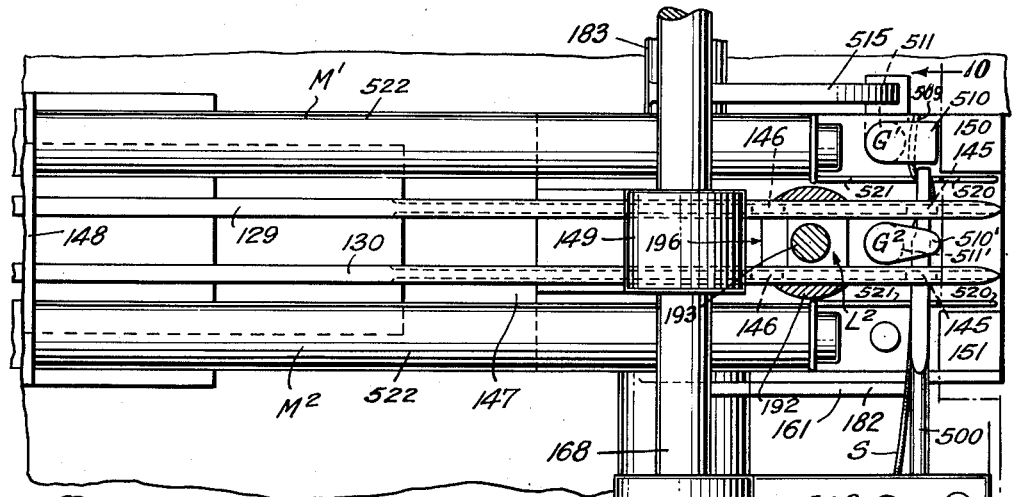
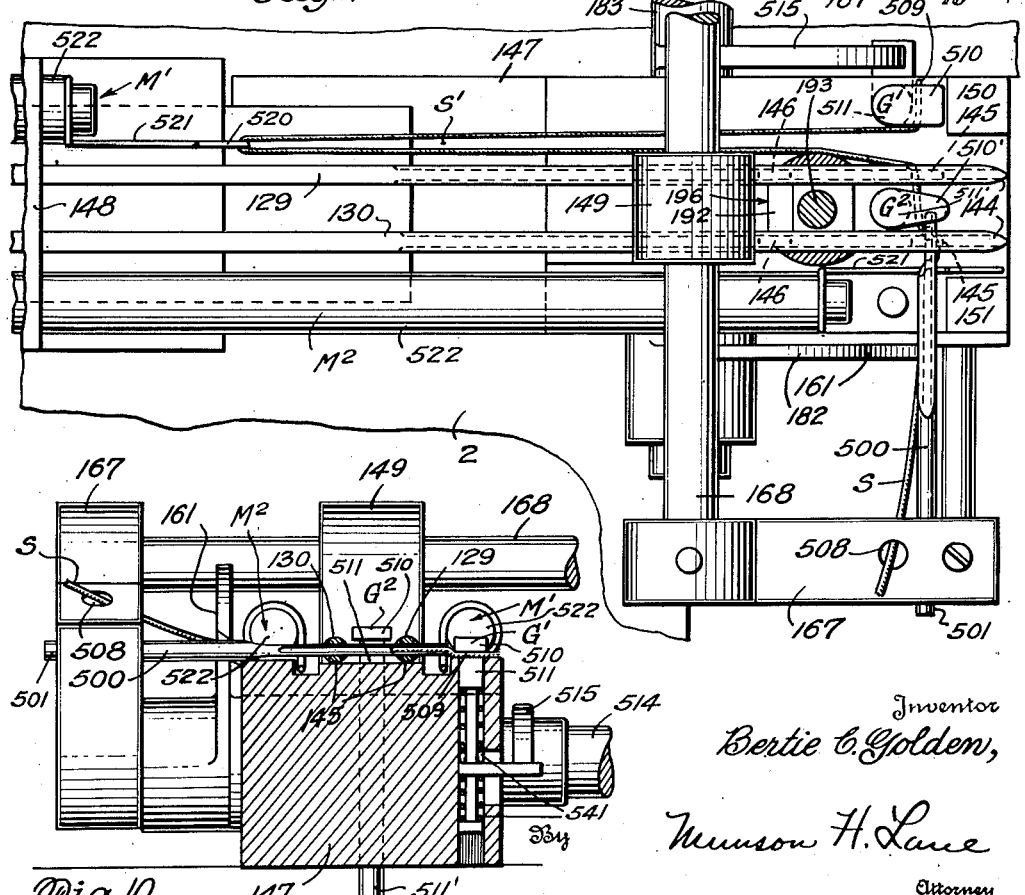
Inventor
Bertie C. Golden,
By Munson H. Lane
Attorney Aug. 28, 1951  B. C. GOLDEN  2,565,495
BAG STRINGING MECHANISM
Filed Dec. 19, 1947  17 Sheets-Sheet 10

Inventor
Bertie C. Golden,
By Munson H. Lane
Attorney

Aug. 28, 1951     B. C. GOLDEN     2,565,495
BAG STRINGING MECHANISM
Filed Dec. 19, 1947     17 Sheets-Sheet 11
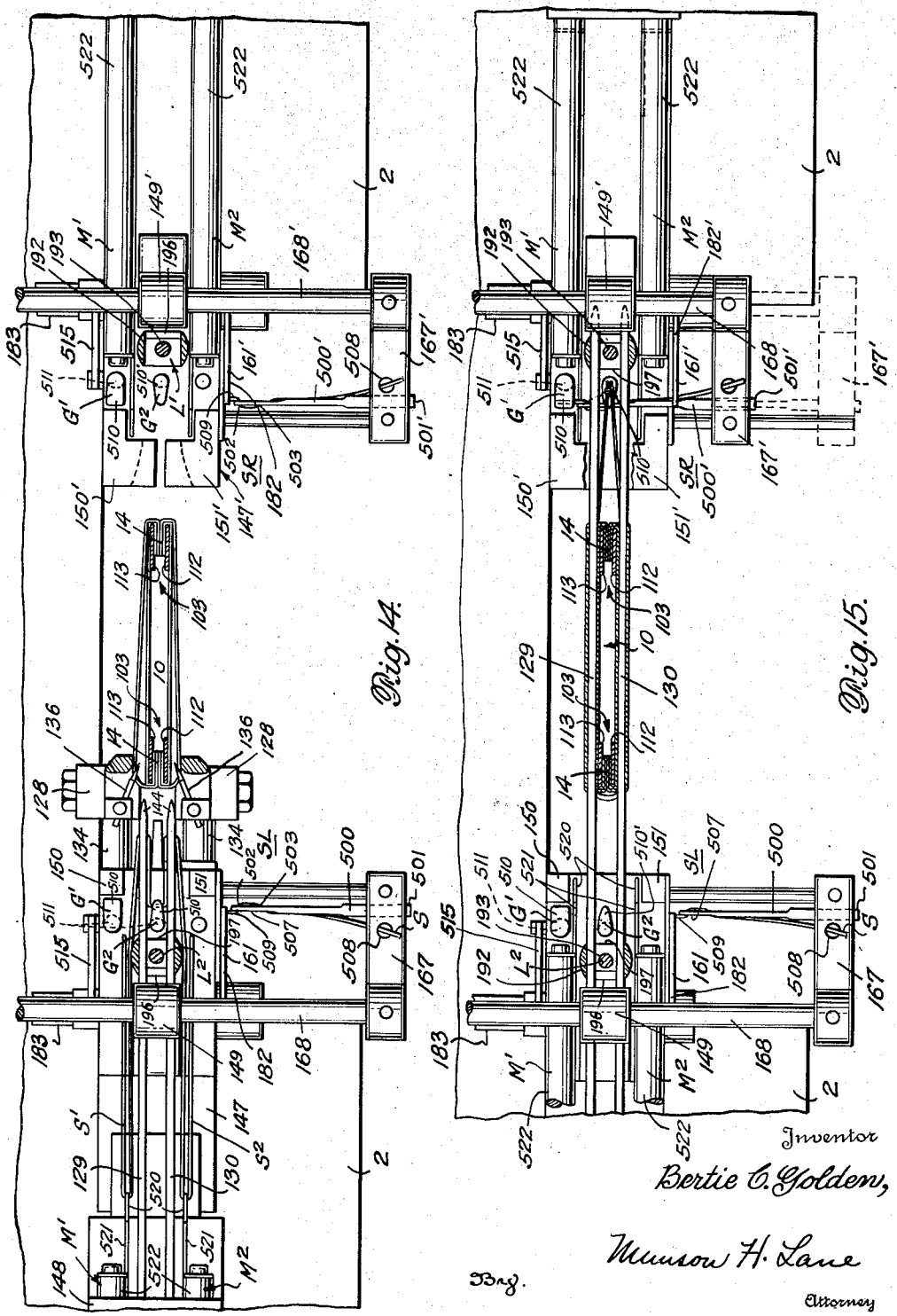
Inventor
Bertie C. Golden,
Munson H. Lane
Attorney

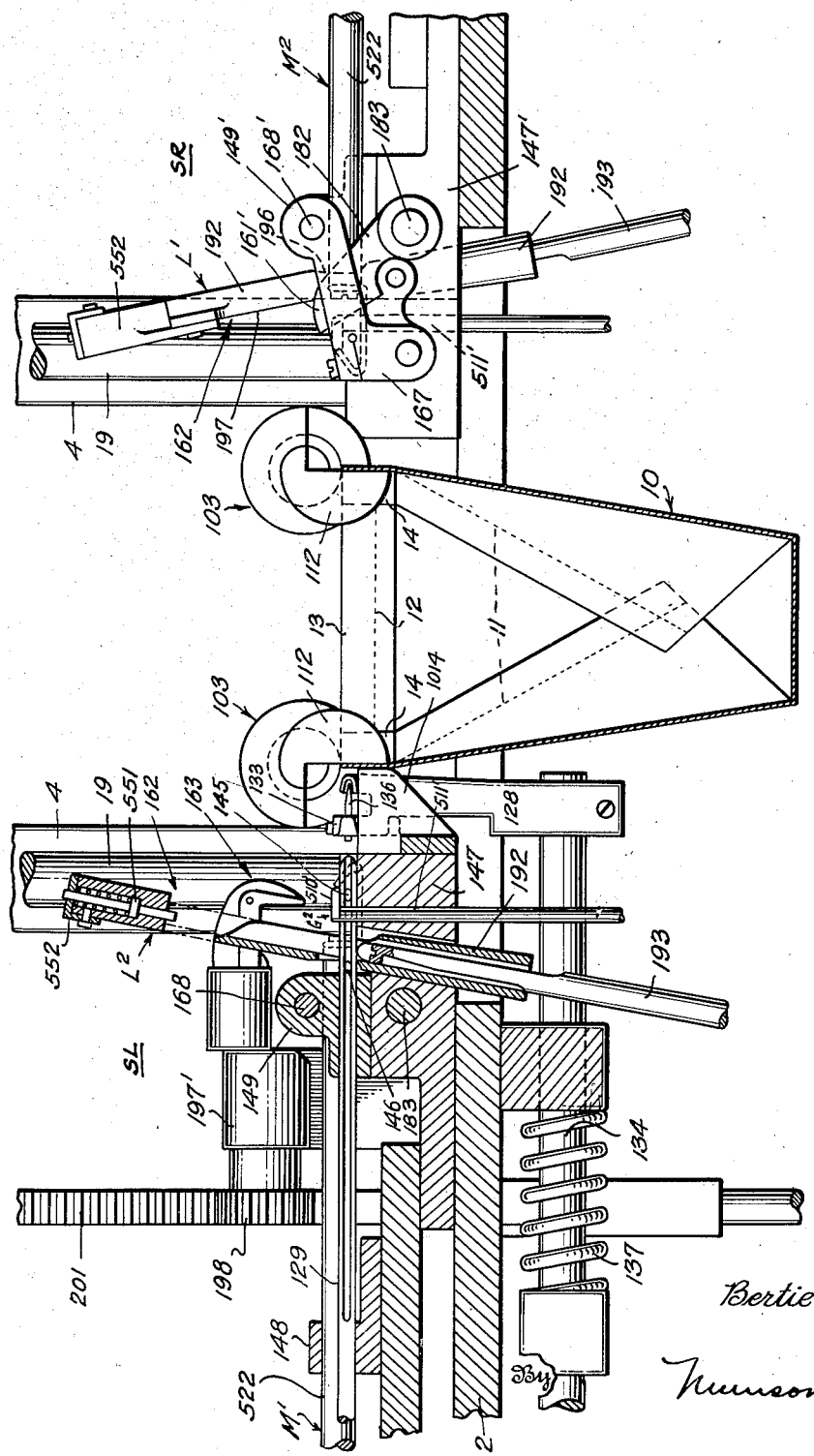

Aug. 28, 1951

B. C. GOLDEN 2,565,495

BAG STRINGING MECHANISM

Filed Dec. 19, 1947

Inventor
Bertie C. Golden,
By Munson H. Lane
Attorney

Aug. 28, 1951  B. C. GOLDEN  2,565,495
BAG STRINGING MECHANISM
Filed Dec. 19, 1947  17 Sheets-Sheet 14
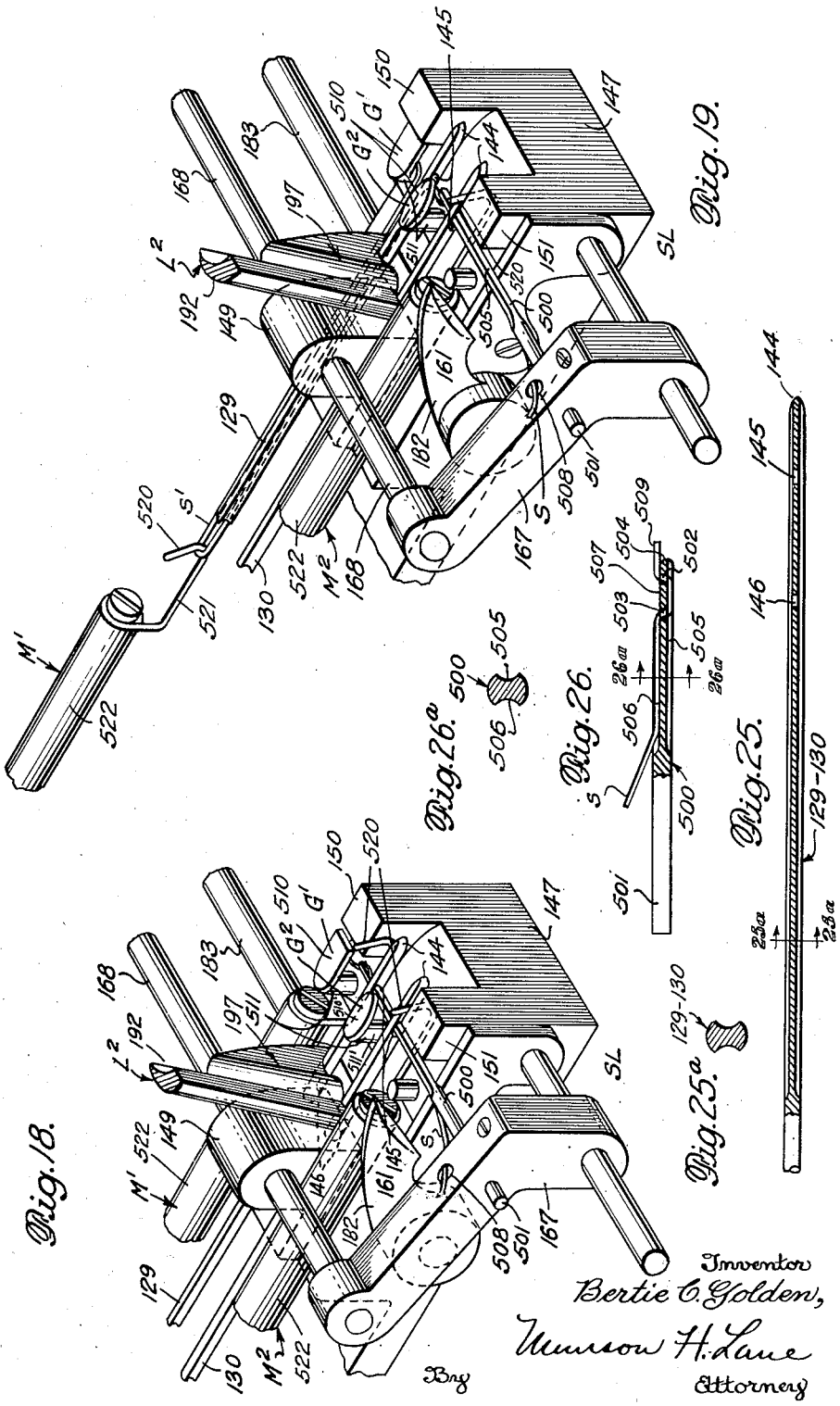

Aug. 28, 1951  B. C. GOLDEN  2,565,495
BAG STRINGING MECHANISM
Filed Dec. 19, 1947  17 Sheets-Sheet 15
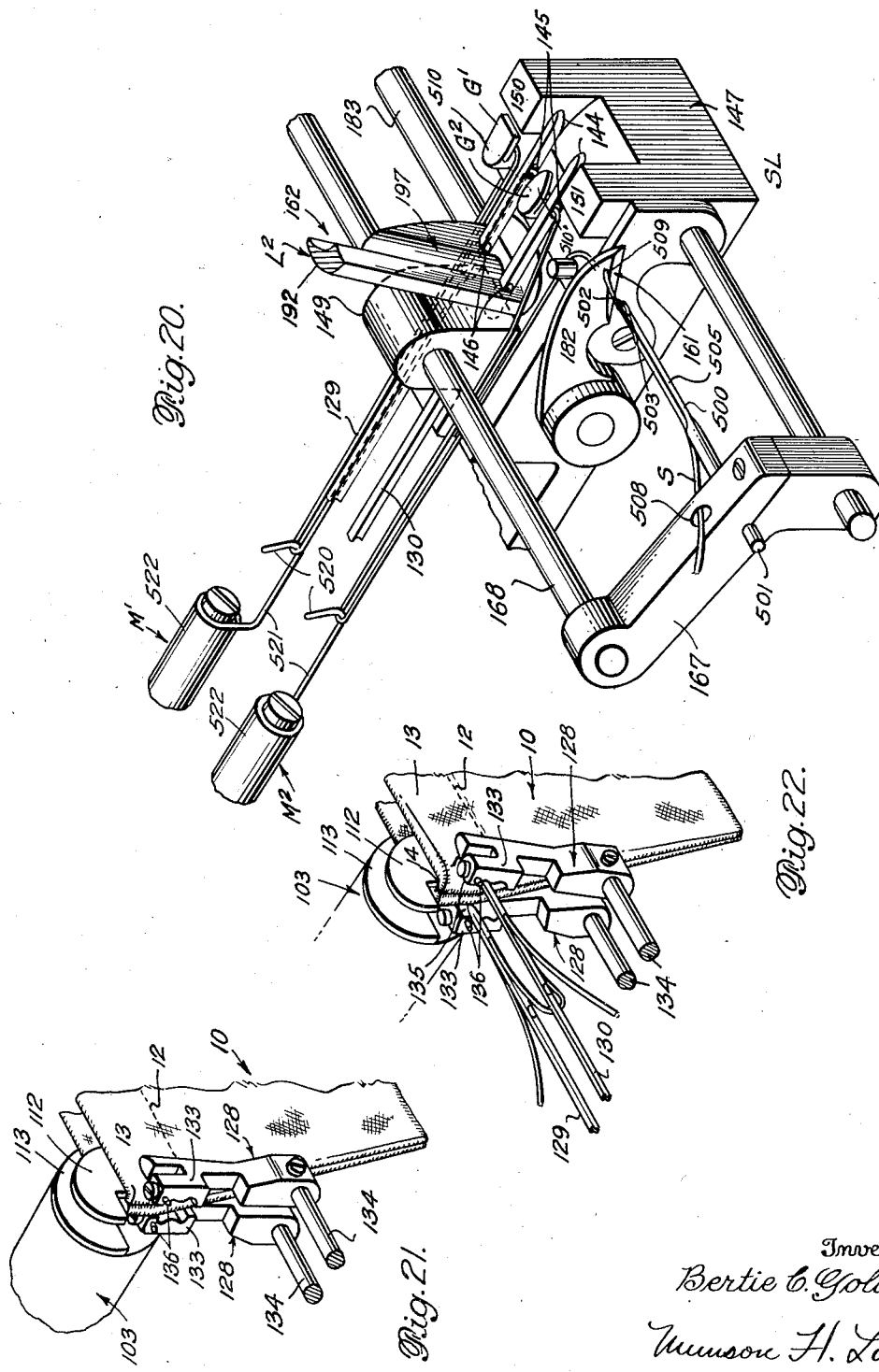
Inventor
Bertie C. Golden,
Munson H. Lane
Attorney

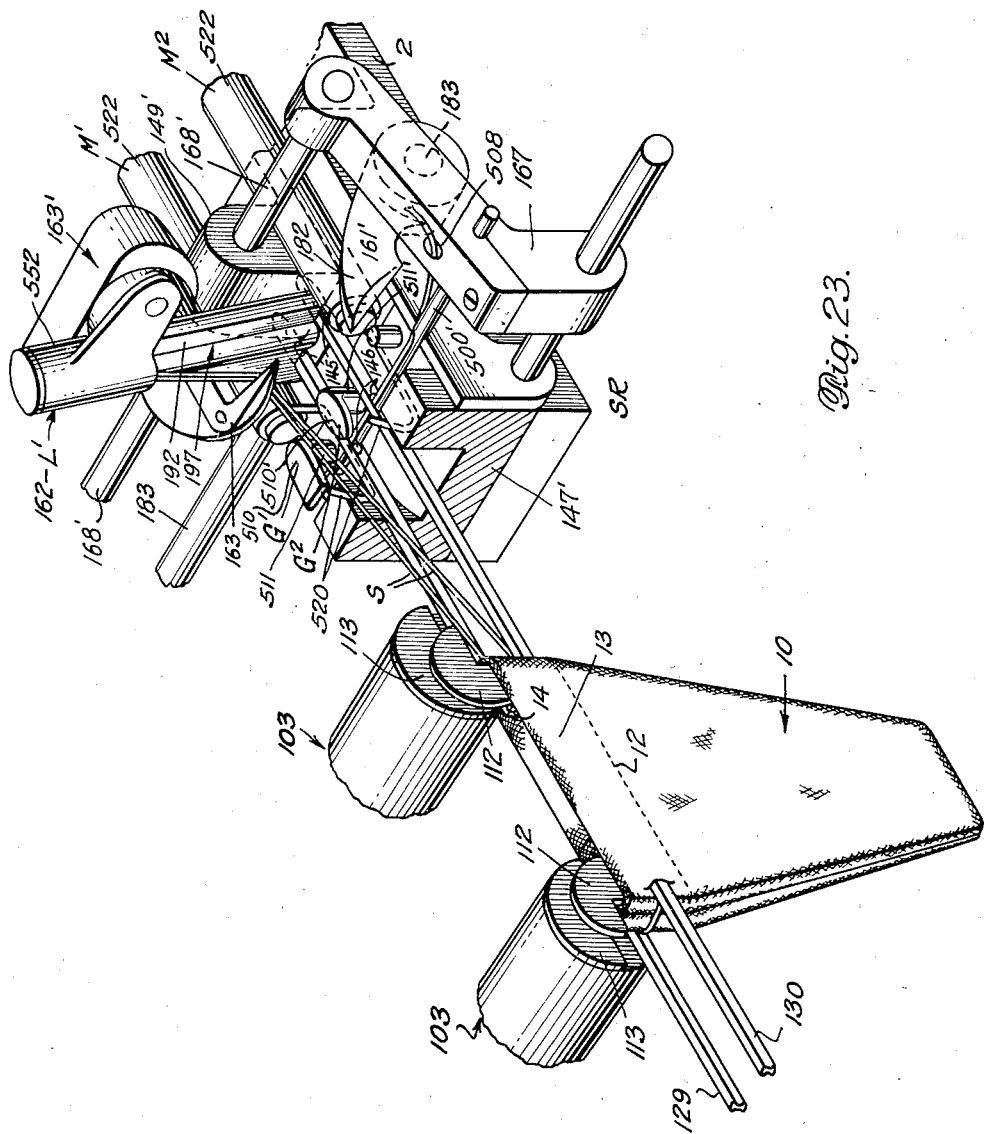

Aug. 28, 1951     B. C. GOLDEN     2,565,495

BAG STRINGING MECHANISM

Filed Dec. 19, 1947     17 Sheets-Sheet 17

Inventor
Bertie C. Golden,
By Munson H. Lane
Attorney

Patented Aug. 28, 1951

2,565,495

UNITED STATES PATENT OFFICE 2,565,495

BAG STRINGING MECHANISM

Bertie C. Golden, Richmond, Va., assignor to Millhiser Bag Company, Inc., Richmond, Va., a corporation of Virginia Application December 19, 1947, Serial No. 792,793

32 Claims. (Cl. 112—2)

The invention relates to improvements in bag stringing mechanism, and more particularly to improvements in bag stringing mechanism of the general type disclosed in my Patent No. 2,296,783, dated September 22, 1942, and in my copending application Serial No. 515,164, filed December 21, 1943, now Patent No. 2,504,974, dated April 25, 1950 wherein a series of bags in chain formation received wrong side out from a previous sewing stage are successively severed from the chain, reversed to bring the bag right side out, and after reversal are provided with drawstrings, the projecting ends of which lie wholly outside of the completed bag.

In common with my prior patent and application the present invention is primarily concerned with the insertion of drawstrings in tobacco bags, but is also adapted to the application of drawstrings to bags of other types.

The manufacture of tobacco bags according to modern production methods involves two separate and distinct stages. The first stage consists in sewing hems at two opposite ends of a rectangular sheet of fabric, folding the sheet back upon itself intermediate its hemmed ends, with the line of fold constituting the central bottom area of the bag, and subsequently sewing the folded sheet along two opposite side margins thereof.

The bag is uniform in width from the hemmed end, which constitutes the open end of the bag, down to its bottom. The bags are sewed in the form of a chain, the bags being connected together at spaced intervals by continuous side seam threads which close the sides of the bag, as above set forth, and the bags are so arranged that the open end of one bag follows the closed bottom end of the preceding bag.

The second stage consists in the insertion of drawstrings into the hems of the individual bags, and as the bags in the chain are wrong side out the stringing stage requires reversal of the bags to bring the right sides out, in addition to insertion of the drawstrings. The machines of my prior patents are designed to handle the bags as they come from the sewing stage in chain formation, and embody means for reversing the successive bags and threading the drawstrings through the hems and subsequently delivering the bags to a collection hopper in an orderly manner, with both drawstrings of each successive bag having their projecting ends lying wholly outside that bag.

These machines include a bag feeder mechanism for advancing successive bags to the reversing mechanism and to the string threading needles. The grippers of the feeder mechanism advance the bag chain a predetermined distance after which a seam thread cutter is brought into play for cutting the foremost bag from the chain. The seam thread cutter and the grippers of the feeder mechanism are mounted on or form part of a carriage which advances a predetermined distance before the seam thread cutter is actuated, and the seam thread cutter is spaced a predetermined distance from the grippers of the feeder mechanism. Thus the seam threads are severed at the same distances from the bottom of each bag, regardless of the fact that the connecting seam threads in the chain might be variable as to length.

The feeder mechanism also includes means for positioning the leading or open end of each successive bag in a predetermined position prior to the gripping action of the grippers of the feeder mechanism to provide accommodation for variable spacing between the bags in the chain. In other words, the bags are accurate with respect to length but are not always spaced equal distances one from another in the chain. Accordingly, each bag is brought into a predetermined and exact position with respect to the feeder mechanism grippers and is gripped in that position, with the seam thread cutter maintaining a definite spacing with respect to the grippers, and the seam thread cutter is brought into play after each bag has been advanced a predetermined distance so that all slack is removed from the bag with the result that the strands are precisely severed in each instance.

As each bag is advanced into the bag reversing zone pin action mechanism coacts with the hem areas of the bag for opening its mouth preparatory to the entry of a plunger gripper acting to reverse the bag. A conditioning plunger is brought into play for looping the bottom area of the bag inwardly to provide a tongue which is grasped by the plunger gripper.

The bag reversing mechanism includes corner grippers which grasp and hold the open end of the bag firmly as the plunger gripper exerts a pull on the bottom of the bag and pulls the bottom through the bag mouth for reversing the same. The corner grippers of the reversing mechanism are so fashioned as to rotate in a peculiar manner to the end that the open end of the bag will be completely reversed in a neat and regular manner preparatory to insertion of the draw strings.

The conventional square-bottomed tobacco bag is uniform in width from the hem down to the bottom. When such a bag is filled there is a decrease in its width throughout the greater part of its length, but the bottom of the bag does not shorten transversely of the bag. In other words, the length of the bottom of the bag will remain substantially the same after the bag is filled as it was before, since the corners of the bag project beyond the width of the bag and present an unsightly appearance. It is desirable to reverse the bag in such manner that the corners are tucked in before the bag is filled. After filling, the corners form nicely and are supported by reason of the material within the bag, and the bag maintains a uniform width from top to bottom. In accordance with my prior patents the reversing mechanism is so designed as to reverse the bags in an efficient manner and at the same time leave the corners of the bag tucked in in such a degree that the bag can be filled in an expeditious manner, with the bag taking a perfectly square bottom with respect to contour, as well as width from top to bottom.

Upon reversal of the bag the drawstring threading mechanism is brought into play for inserting two drawstrings which project in opposite directions from the two sides of the bag, and the drawstrings are cut from length and knotted to provide closed loops which effectively draw the mouth of the bag to a closed position when the drawstrings are pulled simultaneously in opposite directions. The drawstring threading mechanism includes two needles which are arranged to enter the two hems immediately adjacent the seam at one side of the bag for inserting one drawstring, after which the needles, upon their return trip, draw the second drawstring through the hems. A pin action bulges the hems in the path of the needles to facilitate penetration of the hems by the needles for string threading purposes.

One drawstring is first pulled and measured for length, threaded through the hems and knotted to provide a pull string of loop formation, after which the second drawstring is drawn and measured for length, threaded through the same hems and subsequently knotted in the form of a closed loop, with the two drawstrings projecting laterally of the two sides of the bag, and with the projecting runs of the drawstrings lying wholly outside the bag. Complete and accurate reversal of the bags at their mouths before the drawstrings are inserted permits the drawstrings to be so incorporated in the hems that their projecting ends will lie wholly outside the bag. In filling bags, it is important that the bags be of uniform contour and that the ends of the drawstrings lie wholly outside the bag. The machines of my prior patents operate to reverse the bags accurately with respect to contour, and the drawstrings are inserted immediately adjacent the two side seams, with the ends of the strings maintained in the clear of the open ends of the bags.

According to the disclosure of my Patent No. 2,296,783 the bags are fed horizontally to pairs of reversing grippers which retain the corners of the bags during reversal and during the subsequent stringing operation and until such time as the bags are delivered to a suitable stacking mechanism. The bag stringing needles employed in the machine disclosed in this patent are hollow and are provided with thread clamping rods slidable therein. The stringing needles are threaded by means of tubular needle threading devices slidable through the eyes of the stringing needles.

In my copending application Serial No. 515,164, filed December 21, 1943, now patent No. 2,504,974, of which the present application is a continuation in part, and the entire disclosure of which is hereby incorporated by reference as part of the present application, a more compact stringing machine is disclosed equipped with more effective and less expensive stringing needles. According to the disclosure of my Patent No. 2,504,974 the bags are first fed horizontally and then vertically to corner gripping devices located at the stringing station, which corner grippers support the bag vertically during the stringing operation. During the vertical feeding movement of the bags to the corner grippers the bags are partially reversed by means of plunger grippers coacting with bag feeding grippers, which bag feeding grippers are released after delivery of the bags to the corner grippers, and the reversing operation is completed while the corners of the bag are supported by said grippers and prior to the bag stringing operation. According to the disclosure of Patent No. 2,504,974 the hollow needles of Patent No. 2,296,783 are eliminated and a stronger type of needle is employed having a pair of eyes adjacent the forward end thereof and grooves extending longitudinally on both sides of the needle, which grooves are intersected by the eyes. The stringing needles are threaded by means of tubular threading devices passing through the eyes of the needle and coact with suitable clamping and measuring devices. After the bags are strung they may be equipped with tags and delivered to a suitable storage hopper, although, if desired, the tagging mechanisms may be eliminated and the bags fed directly to the storage hopper from the corner grippers without the tagging operation.

According to the present invention the same general type of bag stringing needles may be employed as in my Patent No. 2,504,974 and the same or similar means may be employed if desired for feeding the bags to the stringing position, reversing the bags, severing the individual bags from the bag chain, and after the bags have been strung providing the same with tags if desired and delivering the strung bags, either with or without tags, to a storage hopper.

The present improvements are primarily concerned with means for supplying the drawstring to the bag stringing needles and for clamping and measuring the drawstrings while the bag is supported by the corner grippers in the stringing position. The present embodiment of the invention also discloses improved nickers for punching needle entrance openings in the hems of the bags to facilitate subsequent penetration of the hems by the stringing needles, the subject matter of which is claimed in my copending application Serial No. 154,160, filed April 5, 1950.

Needle threader

According to my present improvement the threader is made from a small solid rod slotted near one end instead of a tube as was used before. The slotting of the rod serves two purposes; a small amount of friction is exerted on the string to prevent it from sliding back and in addition the string is bent so the end of the string will leave the rod at an angle. The rod itself passes through the needle eye during the threading operation.

String handling

As the string is being drawn from the supply it is clamped at the center of the amount to be cut off and held until the knotter starts to tie the ends. This is done so the ends will match after being drawn through the bag.

Hem openers

The hem openers are guided by the bag instead of a stop or other mechanical means. The rounded or inclined lead edge of the point holder exerts a cam action and slides across the hem and the point that penetrates the cloth projects from it the thickness of only one layer of cloth. By using this construction the point is always in the same relation with the bag although some bags may not be stretched down tight against the holders. If the point is not guided by the cloth, unless the bags are stretched exactly the same each time, the hem will either be missed or the point will penetrate both layers of cloth. This subject matter is claimed in my application Serial No. 154,160, filed April 5, 1950.

The present improvements will be described with reference to the bag stringing machine of my prior Patent No. 2,504,974, to which the present improvements have been successfully applied, but it will be understood that the present improvements are not necessarily limited to their application to this particular machine. Brief reference will accordingly be made to some of the features disclosed in my Patent No. 2,504,974, with the tagger mechanism omitted, in order to show a preferred application of the present improvements, but no attempt will be made to describe all of the related mechanism in detail as this is fully set forth in my aforesaid Patent No. 2,504,974.

In the drawings:

Fig. 9 is an enlarged view of a portion of the left hand mechanism of Fig. 8 indicated at SL and showing one of the needle threaders in the second position wherein it has passed through the eyes of the stringing needles and is gripped by the first gripper;

Fig. 10 is a section on the line 10—10 of Fig. 9 showing the operation of one of the grippers upon the end of the string;

Fig. 11 is a view similar to Fig. 9 and showing the first stage in the string measuring operation;

Fig. 14 is a view similar to Fig. 8 with parts shown in Fig. 8 omitted and other parts not illustrated in Fig. 8 disclosed, and indicating the conditioning needles just entering the hems of the bag prior to the entry of the stringing needles;

Fig. 15 is a view similar to Fig. 14 but with the bag stringing needles in their advanced position and indicating the second set of needle eyes being threaded by the needle threaders in position SR;

Fig. 16 is a section on the line 16—16 of Fig. 8;

Fig. 18 is a perspective view of the needle threading and associated mechanism in the position shown in Fig. 9;

Fig. 19 is a view similar to Fig. 18 showing the parts in a position corresponding to those in Fig. 11;

Fig. 20 is a perspective view showing the parts in the same relation as in Fig. 12 and showing the knife severing the string from the source;

Fig. 21 is a perspective view showing the bag gripper and the hem nickers moved to a position just prior to that shown in Fig. 14 wherein the nickers are about to enter the hem;

Fig. 22 is a view showing the parts in a position corresponding to that of Fig. 14;

Fig. 23 is a perspective view showing the needles having passed through the bag and with the knot about to be tied and the needle being threaded by the needle threader in a position corresponding to that indicated at SR in Fig. 15;

Fig. 25 is a longitudinal sectional view of the drawstring needle, a portion being broken away;

Fig. 25a is a section on line 25a—25a of Fig. 25;

Fig. 26 is a view similar to Fig. 25 but showing the threader needle;

Fig. 26a is a section on the line 26a—26a of Fig. 26;

Figure 1:
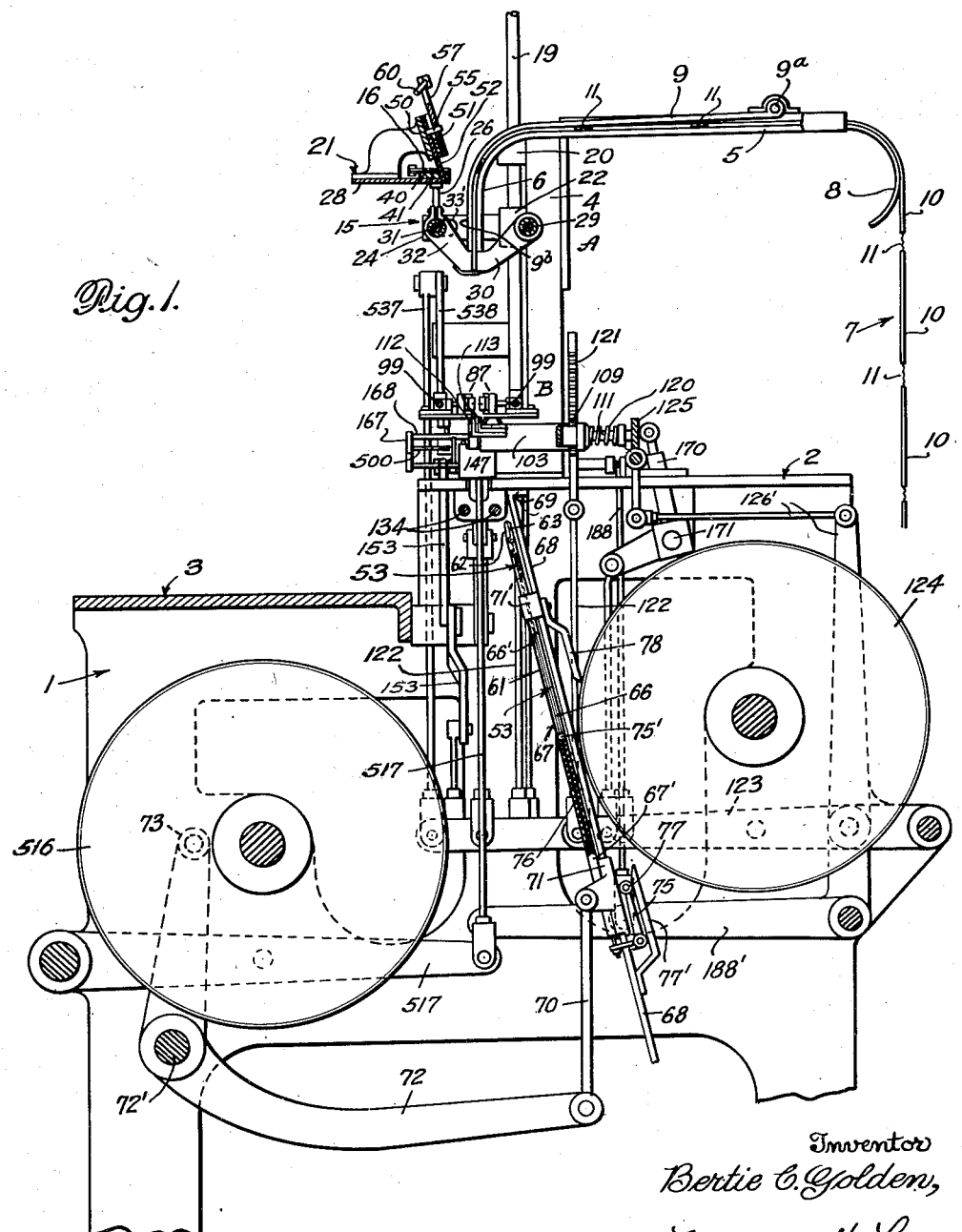
Fig. 1 is a vertical sectional view on the line 1—1 of Fig. 3 showing a machine of the type disclosed in my Patent No. 2,504,974, to which the present improvements are applied, parts of the prior machine being omitted for the purpose of clarity.

The general arrangement of the machine herein illustrated is substantially that of my Patent No. 2,504,974, to which the present improvements have been applied, and some of the stationary and moving parts of the prior machine are shown for the purpose of furnishing a background for the present improvements, although many of the details which are set forth in said patent are not fully disclosed in the present application as to do so might serve to hide the present improvements. So far as possible reference numerals of parts common to both machines are the same as in my prior patent so that the relation of the improvements to the prior machine may be apparent without the necessity for detailed description in the present application of parts which are described and claimed in said Patent No. 2,504,974 and which serve primarily as a setting for the present improvements.

Referring to the drawings, and particularly to Figs. 1 to 5 thereof, the mechanism for bag stringing machine is mounted on a frame 1 of any suitable construction including a front upper platform or table portion 2 on which most of the mechanism herein described is mounted, and a lower rear platform or table portion 3 adapted to support other mechanism described in my copending application, including tagging mechanism, stacking mechanism, and a storage hopper for the completed bags not shown in the present drawings.

Fixed to and rising from the upper table portion 2 are uprights 4 which support an elevated horizontal guide platform 5 which serves to support and feed to a vertical guideway structure 6 a chain 7 of bags which are to be supplied with drawstrings. The horizontal platform 5 extends from the forward portion of the machine over the table 2 to the upper end of the vertical guideway structure 6. The platform 5 is provided at its front end with a downwardly curved plate 8 over which the bag chain 7 passes as it moves upwardly and forwardly for travel over the platform 5.

Pivotally mounted at 9a on the platform 5 are gravity acting arms 9 which serve to compress the bag chain against the guide platform and are provided at their ends with downwardly curved pressure fingers 9b which serve to guide the bag chain downwardly against the guide surface of the structure 6 and to press the bags of the chain in contact therewith. Suitable mechanism for positively feeding the bags along the horizontal guideway 5 may be employed if desired, or reliance for the feeding action may be placed upon the feed grippers of the bag feeding and severing mechanisms 15 and 16 arranged for reciprocating vertical travel adjacent the guideway structure 6. The bag chain may be pulled from a large bundle of bags which are so folded as to permit the chain to be paid out without tangling thereof. The individual bags 10 of the chain 7 are connected through the medium of side seam threads 11 and each side of the bag is provided with a cross stitch 12 forming a hem 13 extending the full width of the bag and defining its mouth end. Preferably the side seam threads are located inwardly of the side edges of the bag, providing the bag body and its hem portions with flaps 14 projecting laterally beyond said threads and adapting the bag to be better gripped by gripping elements of the stringing mechanism.

The bag gripping and feeding mechanism 15, the bag severing mechanism 16 and a slidable plate 51 forming part of the bag reversing mechanism are mounted on a reciprocable carriage 21 carried by rods or bars 19 slidably mounted in openings in the table 2, and in guide blocks 20 fastened to the guideway 5 or to the uprights 4, and these rods or bars 19 support the carriage 21 and the mechanism carried thereby in their movement up and down with relation to the guideway 6. This carriage, which supports the hem gripper means 15 and the bag severing means 16, includes bracket members in the form of blocks 22 and 23 secured to the rods 19, bracket arms 24 and 25 carried by the respective blocks and projecting beyond the rear side of the guideway, bolts 26 and 27 projecting upwardly from the arms 24 and 25, a platform or cutter carrier plate 28 extending between said arms and fastened thereto by said bolts, and an extension arm 28' projecting from one end of the plate portion of the bracket. The blocks 22 and 23 support the sections of a fixed gripper rod or shaft 29 to which are fixedly secured two gripper arms 30, while the bracket arms 24 and 25 form bearings in which are journaled the outer ends of the telescopically connected sections of a rock shaft 31 to which are fixed two gripper arms 32 arranged opposite to and adapted for coaction with the gripper arms 30. The gripper arms 30 are mounted to travel upwardly and downwardly with the carriage 21 but are fixed with relation to the gripper arms 32, which latter, while also mounted to travel upwardly and downwardly with the carriage, are adapted to be oscillated toward and from the gripper arms 30 through rocking motions of their shaft 31. The two sections of said shaft are feathered to each other. The outer end of one of the sections of the shaft 31 has a cranked portion 33' which is journaled in the bracket arm 24, and the outer end of the other section thereof has a cranked portion 34 which is journaled in the bracket arm 25 and terminates in a crank arm 35 having a free end carrying spaced rollers 36. The rollers 36 receive between them a vertically disposed crank rod 37 which is fixed to and receives motion from an oscillatory shaft 38, whereby the grippers 32 may be thrown into and out of action, said rollers being adapted to travel upward and downward on the rod 37 in the upward and downward travel of the carriage 21. The plate or platform 28 is fixed to the brackets 24 and 25 by means of the bolts 26 and 27.

Mounted on the plate 28 is a guideway 50 in which is slidable a plate 51 provided at its lower end with a tongue 52 for coaction with a bag reversing plunger gripper 53. When the foremost bag 10 is brought to the advanced position shown in Fig. 2 the bottom of said bag is pressed inwardly by the tongue 52 to form a tongue or tuck in the bag for engagement by the plunger gripper 53 to turn the bag right side out. The plunger gripper 53 in this action enters the open end of the bag 10 and firmly grasps the tongue fold or tucks to pull the bag right side out when the side seams 11 between the foremost bag and the next succeeding bag are severed. Plate 51 carries a pin 55 projecting outwardly through the guideway 50 and engaging a cam slot 56 in an arm 57 projecting from a lever 58 pivoted at its lower end to the guideway 50, as at 59, and coupled at its upper end by a link 60 with the lever 46 so that when the lever 46 is operated to actuate the scissors 40 and 41 the tongue plate 51 will be operated to form the tongue or tuck in the bag just prior to the cutting of the side seam threads by the scissors. Rods 44 and 45 are operatively connected at one end to the scissors 40 and 41 and at their other end to the lever 46. One end or arm of the lever 46 carries a ball or spherical head 47 pivotally engaged by a fork 48 on an oscillatory crank arm 49 by which, through opposite oscillatory movements of said crank arm, the lever 46 will be rocked to actuate the scissors 40 and 41 and the tongue 52.

The mechanism for operating the carriage 21, the grippers 30 and 32, the cutters 40 and 41 of the severing mechanism 16, and the tongue plate 51 comprises a lever 600 (Fig. 3) coupled by a link 601 to one of the rods 19 of the carriage 21. Said lever 600 is provided with a roller adapted to engage a groove in an operating cam 602, said groove being so formed as to impart to the carriage upward and downward movement at timed periods to shift the carriage 21 and its associated mechanisms to different working positions. The oscillatory rod 38 which imparts the required rocking motions to the gripper shaft 31 is coupled by a crank connection 81 (Fig. 2) to a lever 82 having a roller engaging a groove in an operating cam 83 whereby said rod 38 is oscillated at proper timed periods. In the movements of the carriage 21 the rollers 36 travel up and down on the crank rod 37 which is fixed to and receives motion from the shaft 38. The crank arm 49 which operates the cutters and the tongue plate 51 is carried by a vertically disposed oscillatory shaft 84 which is coupled by crank 85 to a lever 86 having a roller which engages a groove in the operating cam 83 whereby the cutters 40 and 41 and the plate 51 are operated in timed accord with each other and with the gripping arms 30 and 32 and the plunger gripper 53 and its clamping rod.

The plunger gripper bar 53 and rod 66 are slidably mounted on a guide or track bar 68 fixed to the machine frame 1, as indicated at 69 in Fig. 1. The actuating means for conjointly reciprocating the gripper bar and rod comprises a link 70 connected at one end to a guide block or sleeve 71 fixed to the lower end of the bar 61 and slidable on the bar 68, the other end of the link being connected to a bell crank lever 72 pivoted to the frame 1 at 72' and carrying a roller 73 engaging a groove in an operating cam 74. The bar 61 slidably engages a guide block or sleeve 71' fixed to the bar 68 adjacent its upper end, the bar 61 thus being mounted for rectilinear travel on the bar 68 toward and from station A for coaction with the tongue 52 of the tongue plate 51. The bar 61 and rod 66 are, as above described, movable together toward and from the tongue plate, but the rod 66 is also independently movable forwardly and rearwardly on the bar 61 for coaction with the gripper jaw 63. As shown in Fig. 1 the rod 66 is disposed in the slot 67 between portions 66' and 67' of the bar 61, in which portions of the bar 61 the ends of the rod are slidably fitted and through which they extend. The forward end of the rod has a beveled extremity which projects beyond the guide portion 66' for coaction with jaw 63, while the rear end of the rod projects beyond the guide portion 67' for pivotal engagement with an arm of a bell crank rod actuating lever 75. The rod is normally held retracted by a coiled spring 76 disposed about it between the guide portion 67' and a collar 75' adjustably secured to the rod 66. The other arm of the bell crank lever 75 is provided with a friction roller 77 and is adapted for cooperation with combined cam and keeper plates 77' and 78 respectively fixed to the bar 68. Spring 76 normally operates to project the rod 66 forward to the position in which it locks the jaw 63 in closed position, but it is adapted to be moved rearwardly to jaw releasing position by means of the lever 75 and coacting cam plates 77' and 78. Normally, or when the plunger gripper is retracted, the rollered arm of lever 75 lies between the guide member and cam plate 77', into which position it is forced by the plate 77' when the plunger gripper is moved rearwardly to cause the rod 66 to be retracted against the resistance of its spring. The same action occurs when the plunger gripper is moved to a position near the end of its forward traverse and the rollered arm of lever 75 engages the cam plate 78 and is swung inwardly thereby and assumes a position between the bar 68 and plate 78. Thus it will be understood that when the plunger gripper is moved forwardly for coaction with the tongue plate and reversing grippers the rod 66 will be released for movement to locking position by disengagement of the lever 75 from the cam plate 77', but as the plunger gripper nears the tongue plate, lever 75 will be engaged with the cam plate 78, whereby the rod 66 will be retracted to allow jaw 63 to open for the entrance of the tongue of the tongue plate between the jaws 62 and 63 and the pushing of the bag portion in between the jaws 62 and 63 to form the tuck. On the rearward movement of the plunger gripper and the return of the tongue plate to normal position, the tongue of the tongue plate is withdrawn from between the jaws but at its instance of withdrawal the lever 75 moves out of engagement with cam plate 78, whereupon the rod is released and allowed to be operated by its spring to close and lock the jaw 63 in gripping position. The parts remain in this position while the bag is being reversed and until the plunger gripper is fully retracted and the lever 75 engages the cam plate 77', whereupon said lever will be operated to move the rod 66 to bag releasing position.

To facilitate entry of the gripper bar 61 of the plunger gripper 53 into the bag while the mouth of the latter is clamped inside of the hem margins 14 by the grippers 30 and 32, two pin actions or mouth spreaders 87 (shown in detail in my Patent No. 2,504,974). The spreaders are coupled by connecting rods 99 to a bell crank shaft 100 (Fig. 2) coupled in turn to a lever 101 having a roller engaging a groove in an operating cam 102, by which said spreaders are operated in unison and in timed accord with coacting parts of the machine.

The function of the grippers 15, which include pairs of coacting gripping arms 30 and 32, is to feed successive bags at the end of the chain of bags from an upper position A, indicated in Fig. 1, to a lower position, indicated at B, at which lower position the bags are released by the arms 30 and 32 of the feed gripper mechanism 15 and are engaged by corner grippers generally indicated at 103 and including coacting gripper faces 112 and 113. At the lower position the bag stringing operation is performed, and after the completion of the stringing operation the bags may be tagged and delivered to a storage hopper (not shown) in a manner fully described in my Patent No. 2,504,974, or the tagging operation may be omitted and the bags passed directly to the storage hopper.

In passing from the upper station A (Fig. 1) to the lower bag stringing station B the lowermost bag of the series is severed from the chain by means of the scissors mechanism 16 mounted on the carriage 21 and movable therewith, and it is also partially reversed by coaction between the slidable plate 51 and a plunger gripper 52.

After the bag has been delivered to the corner grippers 103 reversal is completed and the bag will then be supported in vertical position as indicated in Figs. 4, 5, 16, 17 and 23, in which position the stringing operation is performed.

Figure 6:
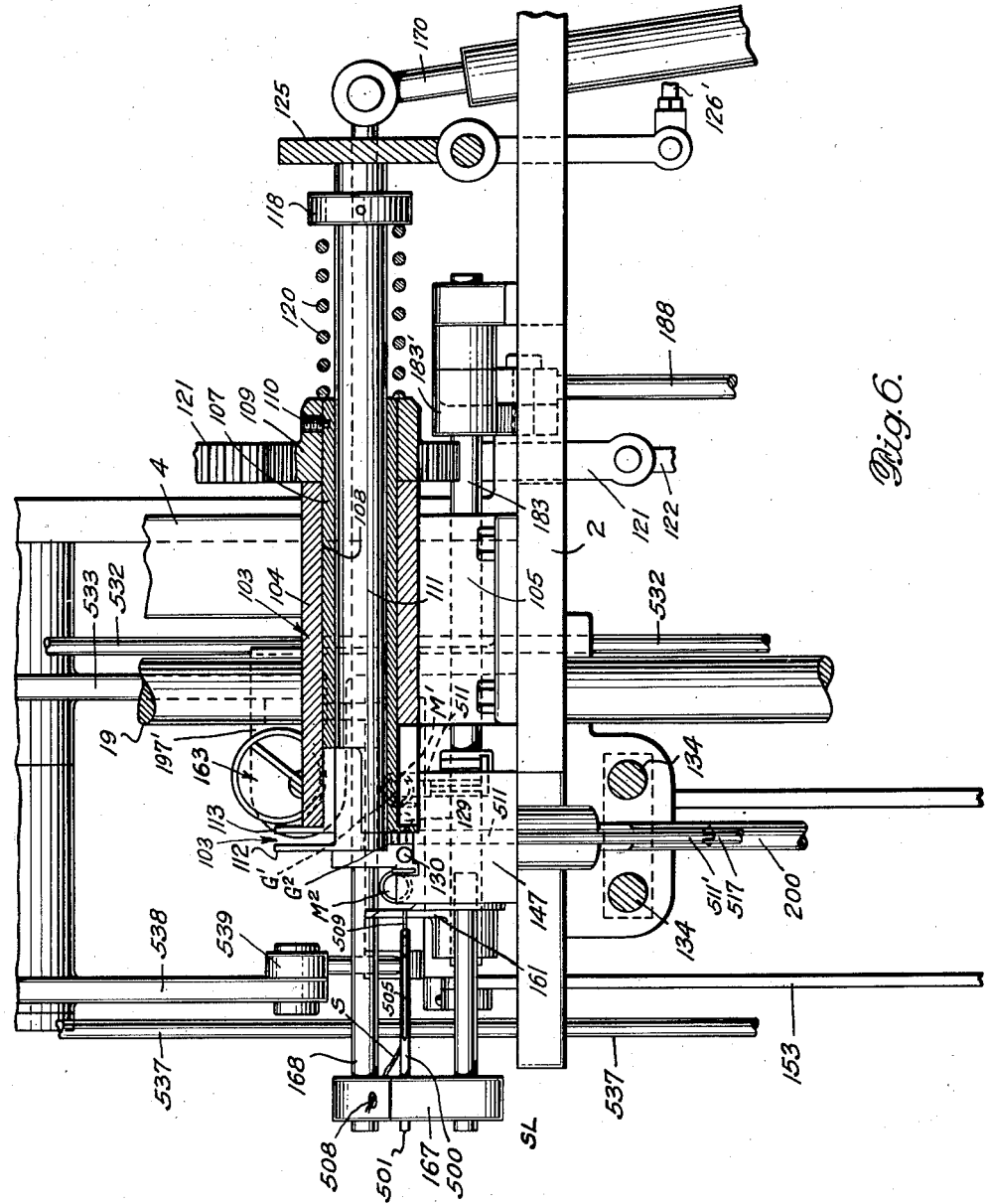
Fig. 6 is a section on the line 6—6 of Fig. 3 showing the bag gripper operating means in their relation to the needle operating means and needle threading means.
Figure 7:
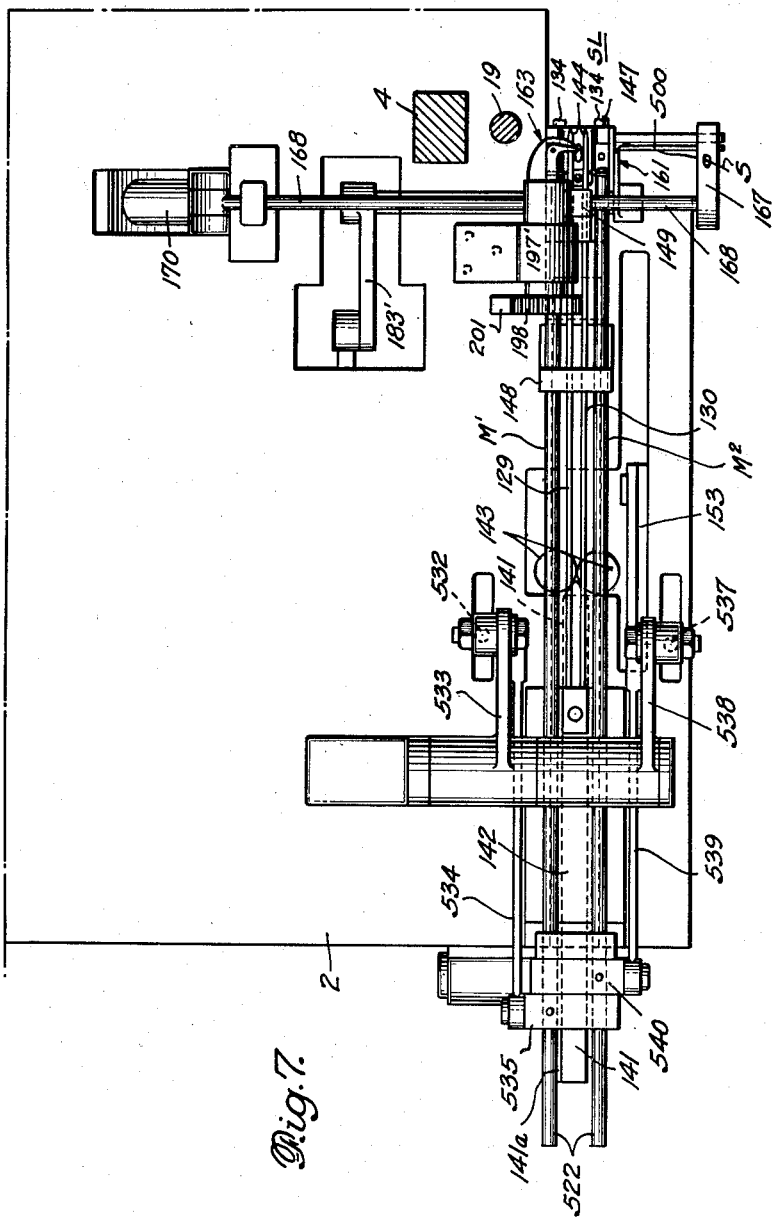
Fig. 7 is an enlarged plan view of the bag stringing needle mechanism and associated parts at station SL in Fig. 3.

Referring now to Fig. 6, it will be readily seen that the reversing corner gripping mechanism 103 comprises a tube 104 having a flange 105 fixed to the table structure 2. Inside the tube 104 is rotatably disposed a hollow shaft 107 extending through a bore 108 in the tube and carrying a pinion 109 secured thereto by a set screw 110.

A shaft 111 is slidably guided by the hollow shaft 107 and the shaft 111 is provided with a lip 112 arranged to move down on the flap 14 of the bag 10 to clamp against a lip 113 on the upper end of the hollow shaft 107. Lip 113 rides on the adjacent end of the tube 104 and is rotatable with the shaft 107 through the medium of the pinion 109. Hollow shaft 107 has a slot for the reception of a key (not shown) fixed to the shaft 111 so that the latter is feathered to the hollow shaft 107 for rotation therewith, but may be moved longitudinally of the hollow shaft 107 for spacing the lip 112 from the lip 113 so as to facilitate entrance of the bag margin 14 therebetween. As shown the collar 118 is secured to the shaft 111, and between said collar and the pinion 109 a compression spring 120 is interposed which holds the lip 112 pressed against the bag flap 14 with sufficient force to secure a firm grip thereon.

The means for operating the grippers 103 comprises a double rack 121 which is arranged in mesh with the two pinions 109. The rack 121 is slidably supported on the table 2 and is coupled at one end by a rod 122 to a lever 123 having a roller to engage a groove in an operating cam 124, whereby reciprocatory motion is imparted to the rack. The shafts 111 have their rear ends arranged in the path of a presser head 125 adapted to slide the shafts 111 against resistance of the springs 120 to open the lip 112 for a clamping action, the springs acting on the shafts to normally hold said lips 112 closed. The presser head 125 is operative through link connection 126' with a lever 126 (Fig. 2) carrying a roller to engage a groove in an operating cam 124 whereby the lips or gripping elements of the grippers 103 are controlled.

Any means of delivering the bag to the stringing position may be resorted to without departing from the spirit of the invention in its broadest aspects, and any suitable means for supporting the reversed bag (now right side out) in stringing position may be employed, although, as previously set forth, the feeding, severing, reversing and bag gripping mechanisms of my aforesaid application are preferred.

Referring particularly to Figs. 4, 5, 14, 15 and 16, the bag 10 when in stringing position and supported by the corner grippers 103 lies intermediate left and right bag stringing stations generally designated SL and SR, respectively, between which positions a pair of bag stringing needles 129 and 130 are adapted to be reciprocated during the stringing operation, as described in my Patent No. 2,504,974. These needles are identical in construction and one of such needles is shown in detail in Figs. 25 and 25a. Associated with the needles 129 and 130 and movable slightly in advance thereof during their initial movement from left to right are a pair of nickers, hem piercers or hem conditioning devices 128, the mounting and operation of which is generally similar to that described in my Patent No. 2,504,974, although in the present device certain improvements in the nickers themselves are disclosed which result in the formation of very small openings for the entrance of the stringing needles, thereby avoiding tearing or marring the bag.

In the threading position the bag 10 lies between fixed blocks 147 and 147' carried by the frame, the space between said blocks defining a threading pathway across which the needles reciprocate back and forth to thread a first drawstring through the hems in one of their directions of movement, and to thread a second drawstring through the hems in their reverse direction of movement. While the bag 10 is supported in stringing position by the grippers 103 the piercers 128 come into action to pierce the hems just prior to the entrance of the needles on their first drawstring threading action. The piercers 128 are arranged at the starting side of the threading pathway, between the block 147 and the supported bag 10 and comprise two needle carrying members or heads 133 mounted at their lower ends on longitudinally movable and rockable shafts 134, said heads 133 having their upper ends arranged to lie on opposite sides of the bag in proximity to the adjacent side seam. The said upper ends of the head members 133 are provided with inner bearing faces 135 beveled or extending obliquely away from the sides of the bag in the direction of forward travel of the needles and provided with pointed piercing elements or conditioning needles 136 extending therefrom in said direction of travel of the needles at a slight inward angle and in spaced relation to the beveled surfaces. During the bag stringing operation the members 133 are adapted to be moved outwardly beyond the line of travel of the needles 129 and 130 and out of contact with the bag but are constantly urged inwardly by rocking motion of their shafts by spring action and are moved forwardly by forward sliding motion of their shafts to cause the conditioning needles 136 in advance of the stringing needles to penetrate and form entrance openings in the bag hems for the needles 129 and 130. The stringing needles 129 and 130 then move forwardly between the conditioning needles 136 as the latter are moved outward laterally by rocking motion of their shafts 134 to bulge the hems to allow the needles 129 and 130 to enter the hems with ease and facility, after which the piercing needles 136 are withdrawn by backward sliding motion of the shafts 134 and rocked back to normal position. By this mode of operation the needles of the piercers 128 are adapted to enter and leave the hems on substantially straight lines to avoid tearing of the hems or the formation of holes of any large size therein. This is important for the reason that the formation of large holes might allow such free movement of the adjacent end of the drawstring as to cause it to hook or lap over the adjacent end of the mouth, causing the latter to gap open and allow tobacco to escape in the use of the filled bag. The described mode of operation of the piercers 128 effectively avoids this objection.

Figure 2:
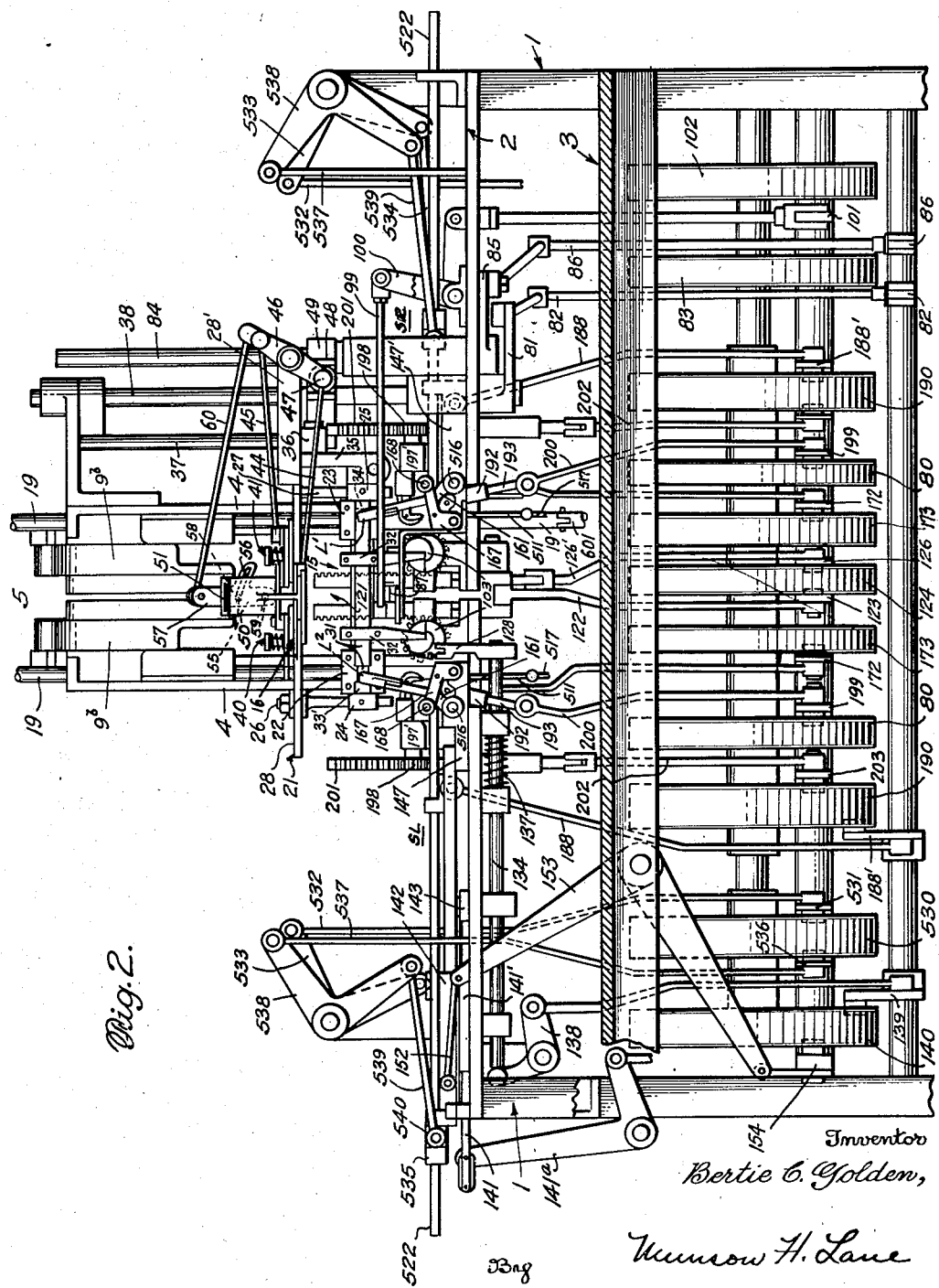
Fig. 2 is a vertical section on the line 2—2 of Fig. 3 showing the general relation between the present improved parts and the parts of the old machine and showing a convenient arrangement of the operating cams with the associated linkage by which the parts of the stringing mechanism are actuated.
Figure 4:
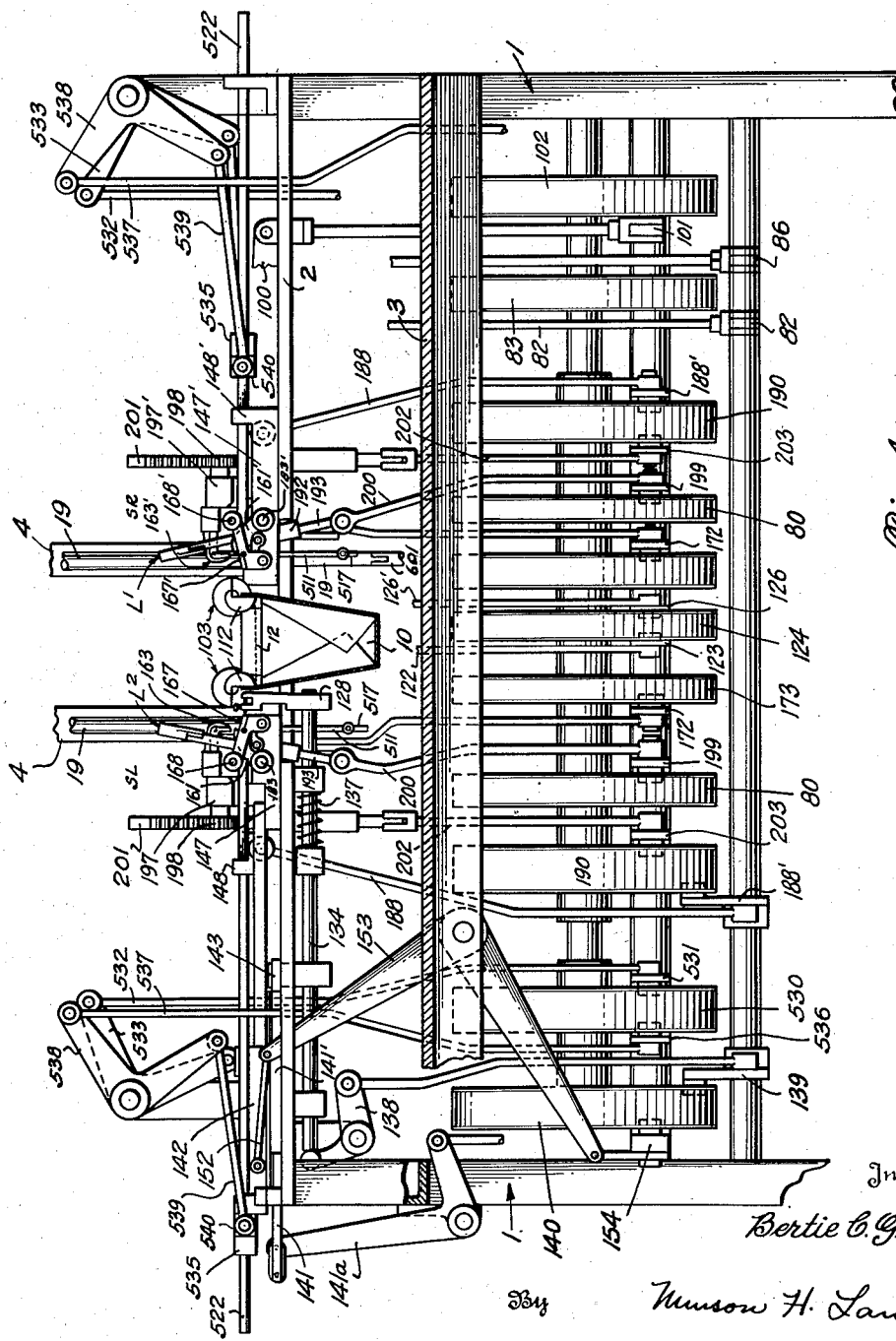
Fig. 4 is a section similar to Fig. 2 showing the operating cams and linkages connected to the operating parts of the present improvements, certain elements being eliminated for clarity.
Figure 5:
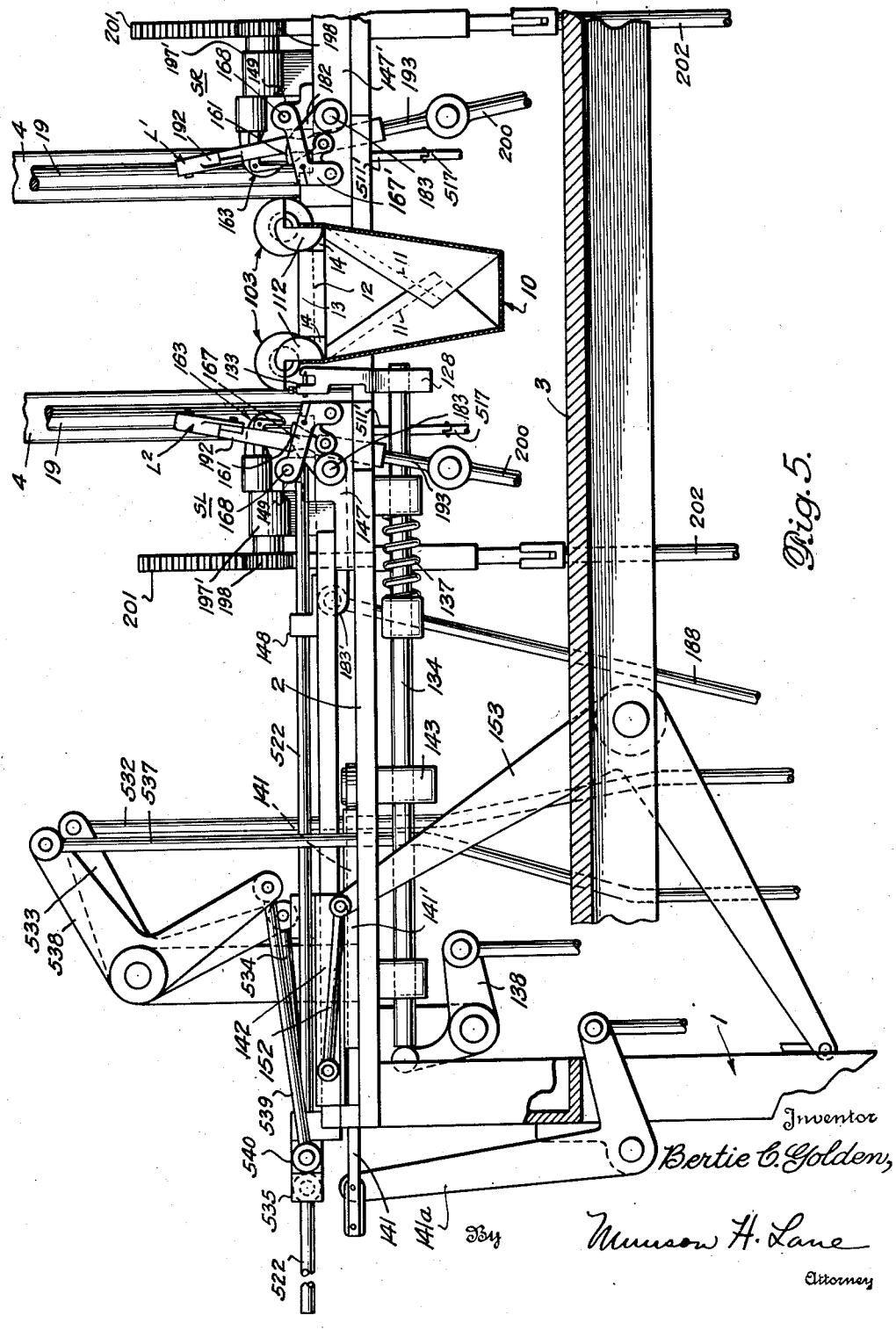
Fig. 5 is an enlarged sectional detail view on the line 5—5 of Fig. 3 showing the operating mechanism for the novel features of the present device and omitting many features common to the old machine.

The piercers 128 are normally held a working distance apart by contact between stops 1013 carried by the heads 133 and a fixed spacing rib 1014 mounted at the front of the abutment 147 carried by the table top 2 and their shafts 134 are held slidably retracted by coiled expansion and torsion springs 137. The shafts 134 are adapted to be slidably moved forwardly by a bell-crank lever 138 coupled to a rock lever 139 having a roller engaging a groove in an operating cam 140 (Figs. 2 and 4). The piercers are adapted to be spread apart on a forward motion of the drawstring threading needles 129 and 130 by a cam member 141 slidably mounted upon the table 2 beneath the slide 142 and within a guide plate 141', the pointed forward end of said cam member 141 being engageable with rollers carried by arms 143 on the shafts 134 to rock them for a piercer spreading action. The rear end of said cam member 141 is connected to one arm of a bell-crank 141ᵃ, the other arm of said bell-crank being coupled to a rocker arm 141ᵇ having a roller engaging a groove in an operating cam 141ᶜ. On the return motion of the needles 129 and 130 the pointed end of the cam member 141 is withdrawn from between the rollers carried by arms 143, and the shafts 134 and members 133 are returned to their normal positions by the spring 137, as will be readily understood. As the bag stringing needles 129 and 130 are advanced for threading the first drawstring through the two hems 13 their points will penetrate the hems on the other side of the bag without difficulty and without the aid of piercers or hem conditioning needles such as those described. The needles 129 and 130 will slide along the inner side walls of the hems so that they will penetrate the two hems on the other side of the bag closely adjacent to the side seam at that side.

*Drawstring threading needles*

The needles 129 and 130 are adjustably fixed at their rear or butt ends to the slide or carriage 142 and have pointed front ends 144 and each is formed adjacent to its pointed end with a front eye 145 and a rear eye 146. The slide or carriage 142 is mounted on the table 2 at one (the left hand) side of the drawstring threading zone, and at that side a horizontally extending fixed guide block 147 is arranged having front and rear guide members 148 and 149 through which the needles 129 and 130 are movable, and a pair of laterally spaced upstanding posts 150 and 151 between which the needles are adapted to pass. At the opposite or right hand side of the drawstring threading space or zone is a fixed horizontal guide block 147' having a guide member 149' and a pair of laterally spaced needle guide members 150' and 151', the inner faces of which are flaringly recessed. The carriage 142 is adapted to be reciprocated to move the needles 129 and 130 across the drawstring threading space through the medium of a link rod 152 coupled to a lever 153 which is in turn coupled to a lever 154 having a roller engaging a groove in the cam 140.

*Needle threader*

Instead of using tubular needle threaders as in my prior patents, which threaders have been found to be expensive and likely to be broken, I prefer to use solid needles 500 and 500' for this purpose, which needles are identical in construction and are preferably similar to the drawstring threading needles 129 and 130 but are shorter and comparatively more rigid in construction. One such needle is shown in detail in Figs. 26 and 26a and comprises a stem portion 501 of circular cross section adapted to be mounted in an arm 167 fixed to an operating rod 168 slidably supported through the guide member 149. As shown, each needle includes a pair of spaced eyes 502 and 503 near the pointed end 504 of the needle, and grooves 505 and 506 adjacent the forward end thereof. One side of the needle is reduced as at 507 adjacent the point from the rear eye 503 to the point 504 to facilitate entry of the needle threader into one or the other of the eyes 145 or 146 of the drawstring threading needles 129 and 130. The string S from which a drawstring for the bag is to be formed is first manually inserted through an opening 508 in the arm 167 and is then threaded through the eyes 503 and 502 of the threader with a portion 509 projecting beyond the point of the threader. It will be noted by reference to Fig. 26 that portions of the string lie within the grooves 505 and 506, thereby enabling the threader to be readily passed through the eye of the stringing needles. The string is supplied from any suitable source (not shown).

Each of the needle threader operating rods 168 and 168' is actuated by means of an arm 170 on a shaft 171 having a crank coupled to a rocker arm 172 having a roller operating in the groove of an operating cam 173 whereby threading of the string S through the eyes 145 and 146 of the stringing needles 129 and 130 is accomplished.

Coacting with the stringing needles 129 and 130 and the needle threaders 500 and 500' and the drawstring forming and the bag stringing operation at the respective stations SL and SR are duplicate sets of string gripping members G¹ and G², threaded measuring devices M¹ and M² and drawstring lifting devices L¹, L², one set being located at each of the stringing stations SL and SR, the structure and operation being substantially the same in each case so that a description of one set will suffice for both. Each of the elements of these sets performs the general function of the corresponding element described in my Patent No. 2,504,974 but in an improved manner. The two drawstring stations SL and SR are also provided with left and right thread cutters 161, 161', and left and right thread knotters 163 and 163', preferably constructed and operating in substantially the same manner as the corresponding elements described in my Patent No. 2,504,974.

*Thread grippers*

Figure 8:
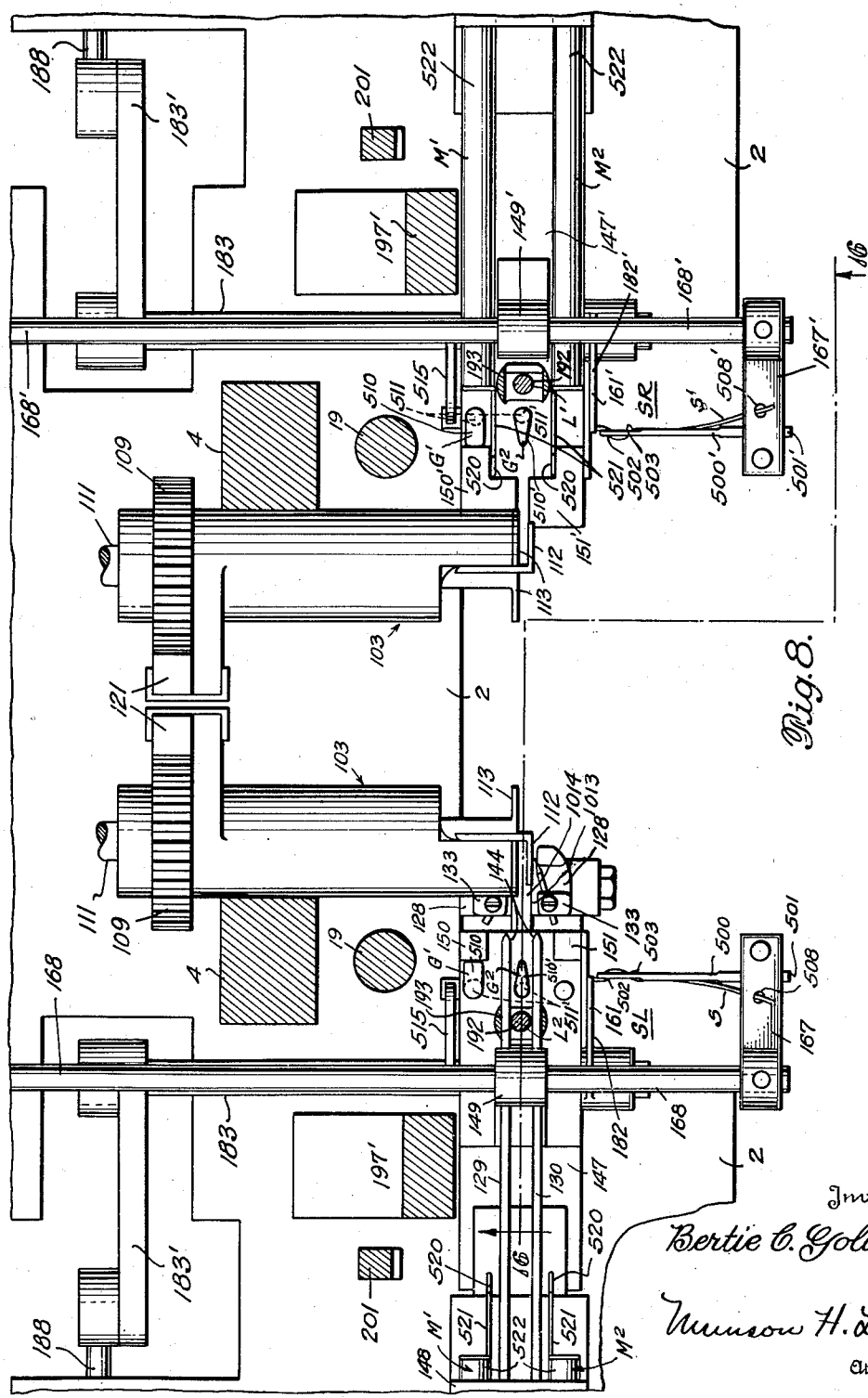
Fig. 8 is an enlarged plan view of a portion of the operating mechanism shown at the approximate center of Fig. 3 and showing the needle threading means in their initial position prior to the threading of the stringing needles.

The construction and operation of the thread grippers or clamps G¹, G² are best illustrated in Figs. 6, 8-16, inclusive and 18-23, inclusive. As shown in Fig. 8, a pair of vertically slidable thread grippers are located at each station, one gripper of each pair being located beyond the stringing needle 129 in a direction away from the threader, and being adapted to engage the free end of the drawstring after the same has been passed through the front eye of the furthest needle 129, and the other gripper of each pair being located intermediate the needles 129 and 130 and being adapted to clamp an intermediate portion of the drawstring during the loop forming operation and to hold the same while the thread cutter 161 is actuated to sever the drawstring from the thread supply. As shown, thread gripper G¹ comprises an enlarged head 510 mounted on a vertical rod 511 movable through guide block 147 or 147' secured to a fixed table portion 2 of the frame of the machine. The rod 511 of the gripper G¹ is actuated by means of an operating cam 190 (Figs. 3 and 8) through a rocker arm 188', suitable linkage 188, and lever 183', the latter being fixed to the shaft 183 and presser foot 515 (hereinafter described) also fixed to the shaft 183. Each gripper G² comprises an enlarged head 510' mounted on a vertical guide rod 511' slidable vertically through guide block or abutment 147 or 147' actuated by means of an operating cam 516 through suitable linkage 517 connected to an operating lever 518 having means coacting with the cam 516, the connections and operating means being duplicated for each gripper G² on opposite sides of the stringing station.

*Thread measuring device*

According to my present improvement two thread measuring devices M¹ and M² are mounted at each bag stringing station (Figs. 3 and 8), one being adapted to engage the string S between the gripper G¹ and the furthest needle 129 to measure a loop S¹ of approximately one-half the length of the completed drawstring, and the other being adapted to engage the string on the opposite side of needle 130 from the gripper G² to form a loop portion S² which, with the loop S¹ previously described, and the connecting portions, forms the completed drawstring after the same has been severed from the thread supply by the operation of the cutter 161.

As shown, each of the measuring devices M¹ and M² is in the form of a hook 520 formed at the end of a stiff wire 521 secured to a rod 522 adapted to be reciprocated in a direction parallel to the movement of bag stringing needles 129 and 130 instead of substantially at right angles to movement as in the previously described embodiment of the invention. It will be understood that measuring devices M¹ and M² are reciprocated in timed relation to the other portions of the bag stringing mechanism. The measuring device M¹ is adapted to be actuated by means of an operating cam 530, rocker arm 531, and linkage 532, bell crank 533, link 534 and block 535, said block being fixed to the rod 522 of the measuring device M¹. The other measuring device M² is actuated from the same cam 530 through rocker arm 536, linkage 537, bell crank 538, link 539 and block 540 fixed to the rod 522 of the measuring device M². A similar arrangement is found at both stations SL and SR.

*Thread cutter*

Figure 12:
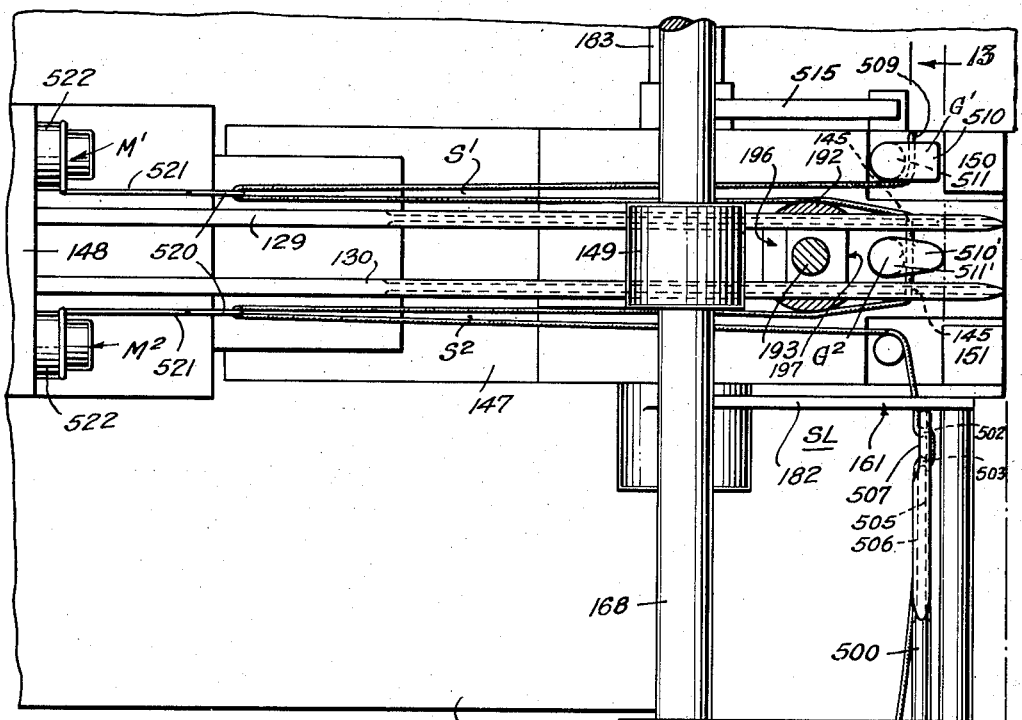
Fig. 12 is a view similar to Fig. 11 and showing the second stage of the string measuring operation.
Figure 13:
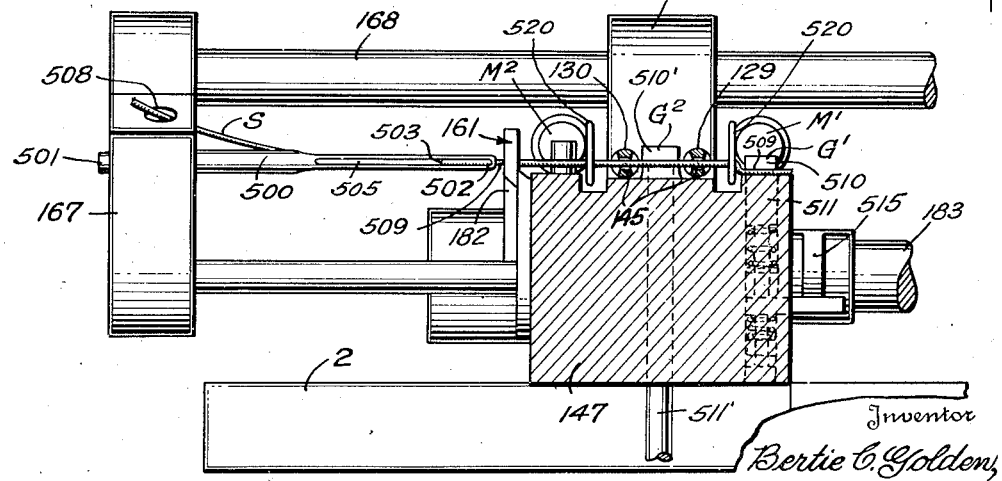
Fig. 13 is a sectional view on the line 13—13 of Fig. 12 showing the string gripped by both grippers.
Figures 17, 24:
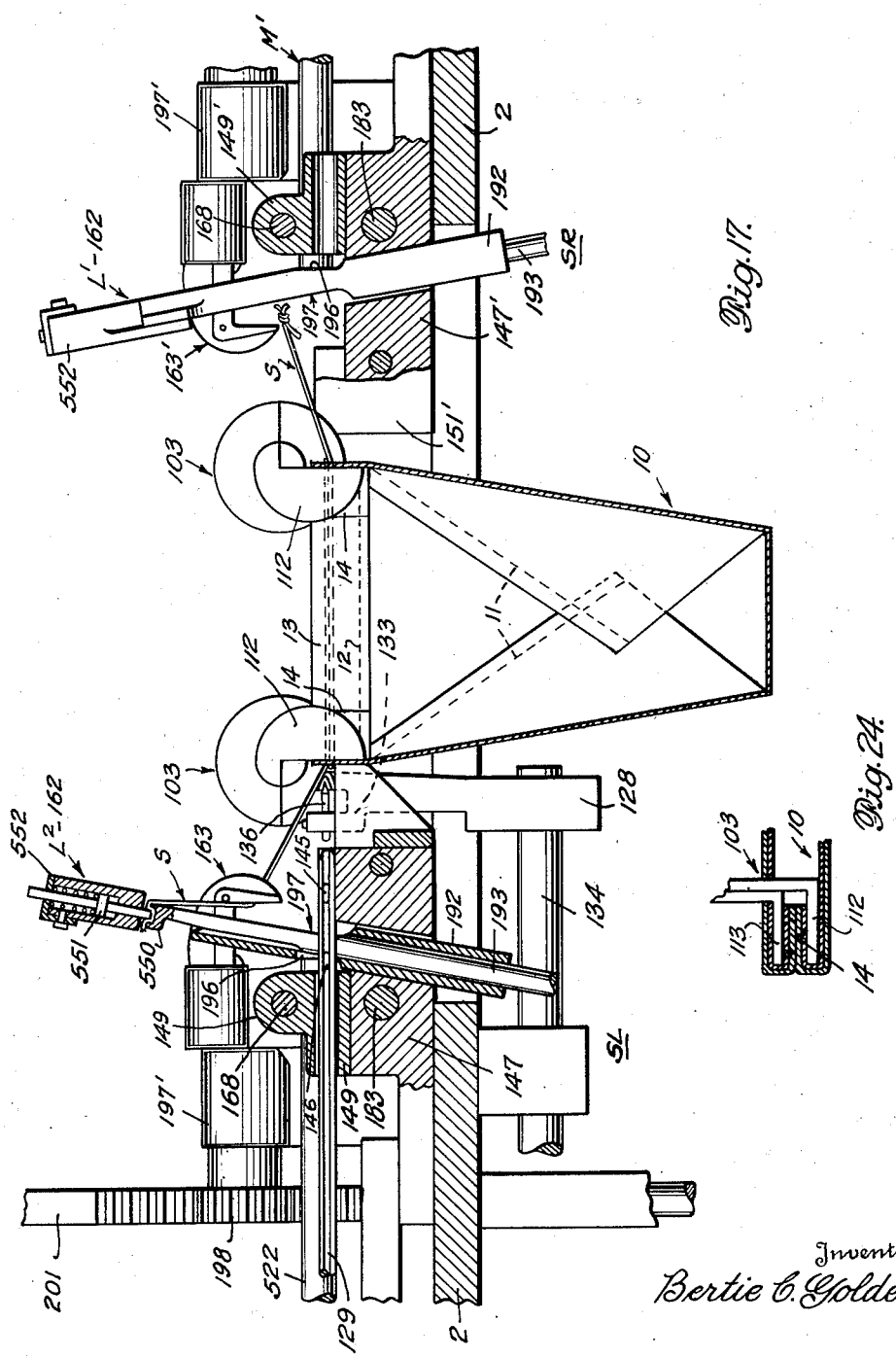
Fig. 17 is a view similar to Fig. 16 but showing the first string knotted and the second string about to be knotted.
Fig. 24 is a detail sectional view showing a modified form of the bag holding jaws equipped with intermeshing teeth for engaging the bag.
Figure 27:
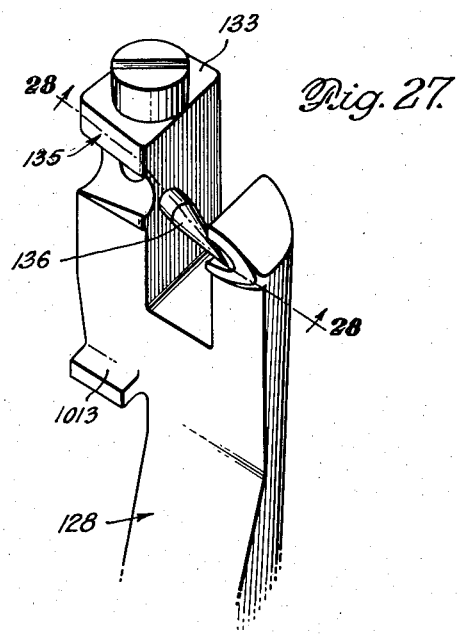
Fig. 27 is a detail perspective view of the upper portion of the hem nicker head and the needle carried thereby.
Figure 28:
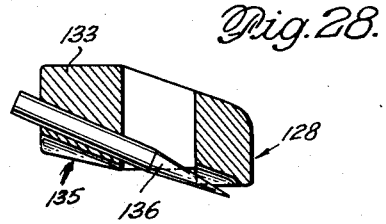
Fig. 28 is a detail sectional view on the line 28—28 of Fig. 27.
Figure 30:
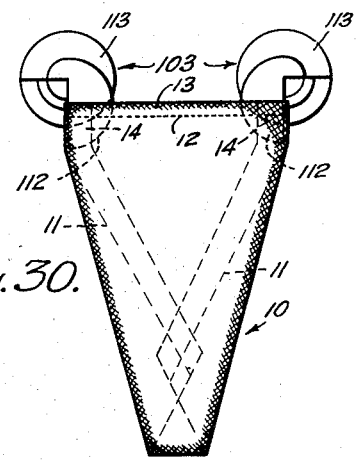
Fig. 30 is a view showing the corner grippers rotated and the bag and its corners reversed.
Figure 29:
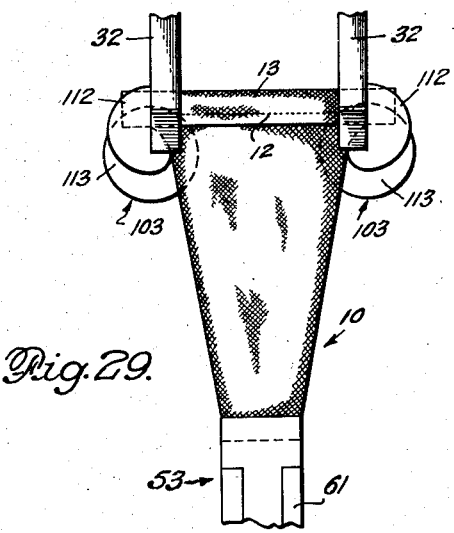
Fig. 29 is a view showing the corner grippers holding the corners of the bag and about to reverse the same.

Each of the thread severing devices 161, 161' comprises a vertically swinging cutter blade 182 fixedly mounted at one end of an oscillating shaft 183. To the opposite end of the shaft 183 there is fixedly secured a lever 183' secured to a connecting rod 188 which, in turn is connected to a lever 188' having a roller engaging a groove in an operating cam 190. The cam groove is so formed that the blade 182 will be actuated to sever the drawstring from the source of supply after the drawstring has been threaded through the stringing needles 129, 130, as shown in Figs. 12 and 20 the loops S¹ and S² of the drawstring have been measured by the measuring devices M¹ and M², and the drawstrings have been clamped by the grippers G¹ and G².

*Drawstring lifting and clamping devices*

Located at each of the stringing stations SL and SR are drawstring lifting and clamping devices 162 (L¹, L²), each comprising a tubular member or standard 192 (Figs. 16 and 17) which extends upwardly through the block 147 (147') to a point elevated above the needle path and within this tubular member is slidably mounted a lifting rod or plunger 193 adapted to engage and lift the ends of the drawstring so as to bring the same to a point where the string is gripped between a depression in the head 550 in the top of the plunger and a spring-pressed gripping member 551 carried by the head portion 552 of the tubular member or standard 192. The standard 192 at its inner side is provided with an opening 196 for passage of the needles, and at its outer side is open or slotted longitudinally as at 197 so that the string ends carried by the stringing needles 129 and 130 may be engaged by the lifting rod or plunger 193 on their release from the needle eyes and may be forced by the rod up the channelway formed by the slotted side of the tubular member 192 until they are clamped between the head of the plunger and the spring-pressed gripper member 551 carried by the head of the standard in a position to be engaged and knotted by the coacting rotary knotter 163 (163').

Figure 3:
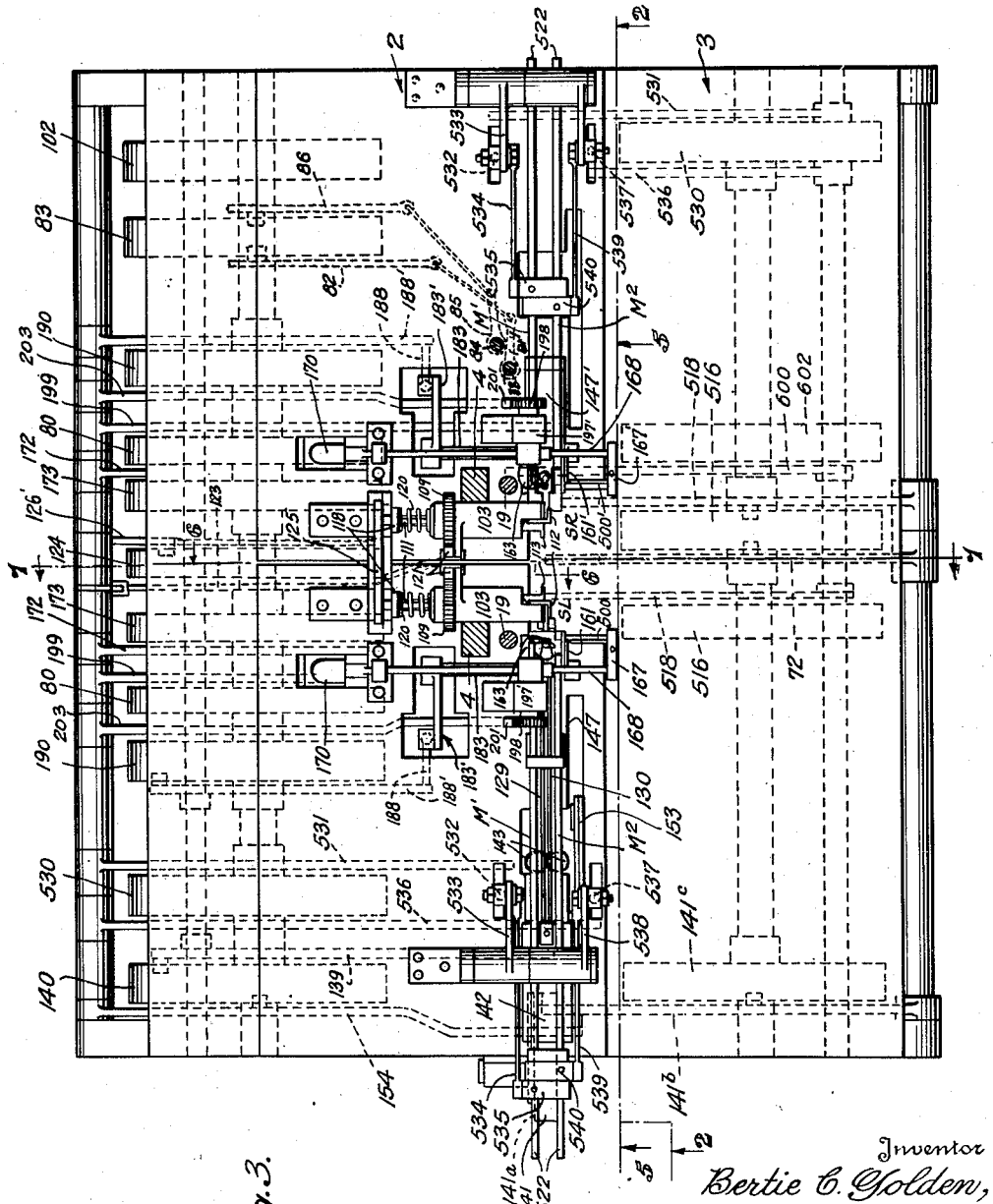
Fig. 3 is a plan view of the machine with parts broken away to show the novel features of the present invention.

The rods or plungers 193 are coupled by means of links 200 to the rocker arms 199 having rollers engaging in grooves in operating cams 80 (Figs. 2 and 3).

*Knotters*

The knotters 163, 163' may be of any desired type, such as are shown for example in the patents to Coleman, Nos. 672,635; 672,636; 755,110; Peterson Patent No. 959,592; Coleman Patents Nos. 1,029,853 and 1,072,575. These knotters are mounted in suitable bearings 197' and are provided with gears 198. Racks or their equivalent 201 meshing with the gears 198 and coupled to rods 202 connected to levers 203 having rollers engaging grooves in the operating cams 190, are employed to actuate the knotters 163, 163'. The knotters form knots d, d' of suitable form to unite the extremities of the free projecting ends of the drawstrings D, D'.

*Operation*

In operation the bags 10 are fed in chain formation from the bag supply (not shown), are successively cut from the supply chain 7 and fed to the corner grippers 103 where they are supported right side out and in vertical position ready for stringing, as indicated, for example, in Fig. 16, each individual bag, after having been severed from the chain of bags and in the course of its passage to the stringing position having been reversed so that it is right side out when the stringing operation commences. Each bag, when in stringing position, occupies a position intermediate the two stringing stations SL and SR between which the stringing needles 129 and 130 are adapted to reciprocate, and at each of which stations a series of operations is performed corresponding generally to the operation described in my Patent No. 2,504,974, but differing therefrom in detail as previously set forth herein. At each stringing position there are provided the fixed blocks or guide members which have been designated 147 and 147', which serve as guides for the stringing needles 129 and 130, for the pairs of thread clamping or gripping members G¹ and G² and for the drawstring lifting and clamping devices L¹, L². The blocks 147 and 147' also serve as fixed abutments for the heads of the thread clamping or gripping members G¹, G² as they are reciprocated in a direction at right angles to the direction of movement of the stringing needles and to the common plane of such needles for clamping the thread, instead of parallel thereto as in my Patent No. 2,504,974.

With the bag in the stringing position as above stated the drawstring threading needle 500 at the stringing position SL, which has been supplied with a string S from the source of supply, is moved from the position indicated in Fig. 8 through the eyes 145 of the stringing needles 129, 130 at right angles to the direction of movement of the stringing needles until the end 509 of the string S, which protrudes beyond the end of the threader 500, is positioned beneath the gripper $G^1$, (Figs. 9 and 18), which is thereupon actuated downwardly to grip the end of the string against the block 147 which serves as an abutment (Figs. 11 and 19). After the gripper $G^1$ has been operated downwardly to grip the string the needle 500 is moved rearwardly, and after it has cleared the path of the string measuring device $M^1$ the said measuring device moves rearwardly, pulling with it the string S to form the first loop portion $S^1$ therein. As the threading member 500 continues rearwardly, and after it has cleared the path of the second measuring device $M^2$ the second gripper $G^2$ is moved downwardly to grip the center of the string S. After the gripper $G^2$ has been moved into string gripping position and the threading member 500 is clear of the measuring device $M^2$ this member is moved rearwardly to form the second loop $S^2$ in the string S. With the measuring devices $M^1$ and $M^2$ fully actuated to form the loop portions $S^1$ and $S^2$ in the string S, thereby measuring off the desired amount of string required in the bag stringing operation, and with the needle 500 fully retracted, the severing device 161 is actuated to sever the string S from its source of supply.

It may be noted at this point that the gripper $G^1$ and the knife 161 are both operated through the same medium, and accordingly, in order to eliminate breakage of the gripper $G^1$ and the presser foot actuating the same a resilient connection 541 (Fig. 10) is provided between the gripper $G^1$ and the presser foot 515. After the string has been measured off and cut to length the gripper $G^1$ is released and the fist step of the stringing operation commences, the gripper $G^2$ remaining in gripping position to prevent the string from slipping until just before the knotter starts tying the ends of the string, at which time the gripper $G^2$ is released.

In order to facilitate the entrance of the needles 129 and 130 and the drawstring carried thereby into the hem of the bag 10, the hem piercers 128, having needles 136 fixed in the heads thereof, are moved toward the bag in advance of the bag stringing needles 129 and 130 until they reach the position where the piercer needles 136 have punctured the hems H of the bag. At this point they are spread apart, thereby causing the punctured holes in the hems of the bag to come into alignment with the needles 129 and 130. The needles 129 and 130, carrying the measured string, are moved to the right through the hem H of the bag until they come to rest at a point where the free ends of the string S are picked up and carried upwardly by the plunger 193 of the thread holding member 162 at the stringer station SR to a point where the free ends of the string are slidably retained between the head of the plunger and the spring-pressed member 551 carried by the head of the tubular standard 192. With the free ends of the string held by the lifting and thread holding mechanism 162 the knotter 163' is operated to form a knot in the strings and at the same time cut off any surplus string beyond the knot. The end of the string is not positively gripped or clamped by the member 162, but a sufficient friction is applied thereto by reason of the spring-pressed member 551 to temporarily retain the string end in place, while permitting slippage toward the knotter as the knotter requires extra string. This is desirable in order to keep the knotter from breaking the string, and also to tighten the string around the knotter so that the string will not fall out of place before completion of the knot tying operation. During the tying of the knot the threading needle 500' at the stringer station SR is moved forward through the rear eye of the bag stringing needles 129, 130 until a protruding end of the string S' is positioned beneath the gripper $G^1$. The operation of the threading mechanism and related parts at station SR is similar to that at station SL except that the rear eyes 146 of the stringing needles are threaded at this station (Figs. 15 and 23).

The invention has been described in detail for the purpose of illustration, but it will be obvious that numerous modifications and variations may be resorted to without departing from the spirit of the invention.

I claim:

1. In a bag stringing machine, in combination with a pair of bag stringing needles adapted to be reciprocated between a pair of stations between which a bag to be strung is supported, each station including needle threading means, drawstring clamping means, drawstring measuring means, and a fixed abutment, means for reciprocating the needles between the two stations to string the bag, said needle threading means at each station comprising pointed thread carrying rods adapted to reciprocate at right angles to the direction of movement of the stringing needles each threading rod having a thread carrying eye extending transversely through the rod adjacent the pointed end thereof, in which eye the thread is freely carried.

2. In a bag stringing machine, in combination with a pair of bag stringing needles adapted to be reciprocated between a pair of stations between which a bag to be strung is supported, each station including needle threading means, drawstring clamping means, drawstring measuring means, and a fixed abutment, means for reciprocating the needles between the two stations to string the bag, said needle threading means at each station comprising pointed thread carrying rods adapted to reciprocate at right angles to the direction of movement of the stringing needles, said thread carrying rods each having spaced transverse eyes in which the thread is loosely carried.

3. In a bag stringing machine, reciprocating needle means for threading a bag, and yieldingly mounted hem opener means movable in advance of the bag threading needle means, said hem opener including a needle holder and a needle, the lead edge of the needle holder being constructed and adapted to slide across the hem of the bag, and the needle carried by the holder being inclined outwardly therefrom only such a distance that the point thereof will penetrate a single thickness only of the cloth.

4. In a bag stringing machine, means comprising a pair of horizontally disposed needles for threading a bag, a fixed plate arranged below the needles and extending in a plane parallel to the plane of the needles, said plate comprising a thread clamping abutment, means for threading the needle means from a supply string, a clamping member mounted independent of the needle means for clamping the string at one end of a drawstring portion to be formed against the clamping abutment, means for pulling out the supply string to form a drawstring portion, a second clamping member mounted independent of the needle means for clamping another portion of the supply string against the abutment, means for operating the needles, means for actuating the pulling means in a direction parallel to the direction of movement of the needles, and means for moving the clamping members in a direction at right angles to the plane of the needles.

5. In a bag stringing machine, means comprising a pair of needles for threading a bag, a fixed plate arranged below the needles and extending in a plane parallel to the plane of the needles, said plate comprising a thread clamping abutment, means for threading the needle means from a supply string, a clamping member mounted independent of the needle means for clamping the string at one end of a drawstring portion to be formed against the clamping abutment, means for pulling out the supply string to form a drawstring portion, a second clamping member mounted independent of the needle means for clamping another portion of the supply string against said abutment, means for operating the needles, means for severing the drawstring portion from the supply string, and means for operating the clamping members at right angles to the direction of movement of the needles.

6. In a bag stringing machine, a fixed thread clamping abutment plate, a pair of parallel needles arranged above said plate and movable in a plane parallel to the abutment plate, means for threading the needles from a source of supply of a supply string, a thread clamping member disposed at one side of the needles for clamping the string against the abutment, means for pulling out the string to form a drawstring portion, a second clamping member disposed intermediate the needles for clamping the string against the abutment, means for reciprocating the needles, and means for actuating the clamping members in a direction at right angles to the common plane of the pair of needles.

7. In a bag stringing machine, a fixed plate comprising a thread clamping abutment, a pair of parallel needles arranged above said plate and movable in a plane parallel to the abutment plate, means for threading the needles from a source of supply of a supply string, a thread clamping member disposed at one side of the needles for clamping the string against the abutment, means for pulling out the string to form a drawstring portion, a second clamping member disposed intermediate the two needles for clamping another portion of the string against the abutment, means for reciprocating the needles, and means for actuating the pulling means in a direction parallel to the direction of movement of the needles.

8. In a bag stringing machine, drawstring threading needles, each having a front eye and a rear eye, means for reciprocating the threading needles, needle threader means for successively threading the front and rear eyes of the needles from sources of drawstring supply, puller means coacting with said drawstring threading needles for pulling the drawstrings for length, and means for actuating said puller means in a direction parallel to the direction of movement of the threading needles.

9. In a bag stringing machine including drawstring threading needles, each having a front eye and a rear eye, means for reciprocating the threading needles, needle threader means for successively threading the front and rear eyes of the needles from sources of drawstring supply, puller means coacting with said drawstring threading needles for pulling the drawstrings for length, cutters for severing the drawstrings from the sources of drawstring supply, and means for actuating said puller means in a direction parallel to the direction of movement of the threading needles.

10. In a bag stringing machine for bags having hems at their mouth ends, a pair of main needles for inserting two drawstrings in opposite directions through the hems, each needle having a front eye and a rear eye, means for successively threading the front and rear eyes of the needles from string supply sources and forming drawstrings therefrom, means for actuating the needles to thread the drawstrings through the bag hems, said needle threading means comprising needles reciprocable at right angles to the main needles each having a pair of eyes loosely carrying the thread to be inserted.

11. In a bag stringing machine, needle means for threading a bag, a fixed clamping abutment, means for threading the needle means from a supply string, a clamping member mounted independent of the needle means for clamping the string at one end of a drawstring portion to be formed against the clamping abutment, means for pulling out the supply string to form a drawstring portion, a second clamping member mounted independent of the needle means for clamping another portion of the supply string against the said abutment, and means for actuating said clamping members in a direction at right angles to the direction of movement of the needle means.

12. In a bag stringing machine, needle means for threading a bag, a fixed clamping abutment, means for threading the needle means from a supply string, a clamping member mounted independent of the needle means for clamping the string at one end of a drawstring portion to be formed against the clamping abutment, means for pulling out the supply string to form a drawstring portion, a second clamping member mounted independent of the needle means for clamping another portion of the supply string against the abutment, means for severing the drawstring portion from the supply string, means for operating the needle means, and means for actuating said clamping members in a direction at right angles to the direction of movement of the needle means.

13. In a bag stringing machine, means including a pair of needles for threading a bag, means for threading the needle means from a supply string, a clamping member mounted independent of the needle means for clamping the string at one end of a drawstring portion to be formed, means for pulling out the supply string to form a drawstring portion, a second clamping member mounted independent of the needle means for clamping another portion of the supply string, means for reciprocating the needles, and means for actuating the pulling means in a direction parallel to the direction of movement of the needles.

14. In a bag stringing machine, means including a pair of needles for threading a bag, a clamping abutment, means for threading the needle means from a supply string, a clamping member mounted independent of the needle means for clamping the string at one end of a drawstring portion to be formed against the clamping abutment, means for pulling out the supply string to form a drawstring portion, a second clamping member mounted independent of the needle means for clamping another portion of the supply string, means for severing the drawstring portion from the supply string, means for reciprocating the needles, means for actuating the pulling means in a direction parallel to the direction of movement of the needles, and means for actuating the clamping means in a direction at right angles to the plane of the pair of threading needles.

15. A bag drawstringing machine including a fixed plate comprising an abutment, a pair of parallel stringing needles movable over the abutment plate and each having an eye, means for passing a supply thread through the eyes of the needles, means for clamping the thread at one end of a drawstring portion to be formed against the abutment and leaving the remainder of the thread free to be drawn out, means for drawing out the thread to form a measured drawstring portion, means for clamping another portion of the thread against the abutment, means for severing the drawstring portion from the supply thread, means for operating the needles to thread the so formed drawstring through the bag, and means for moving the clamping means in a direction at right angles to the common plane of the stringing needles.

16. A bag drawstringing machine including a fixed plate comprising an abutment, a pair of stringing needles movable over the plate and each having an eye, means for passing a supply thread through the eyes of the needles, means for clamping the thread at one end of a drawstring portion to be formed against the plate and leaving the remainder of the thread free to be drawn out, means for drawing out the thread to form a measured drawstring portion, means for clamping another portion of the supply thread against the plate, means for severing the drawstring portion from the supply thread, means for reciprocating the needles to thread the so formed drawstring through the bag, and means for actuating the drawing means in a direction parallel to the direction of movement of the stringing needles.

17. In a bag stringing machine, supporting means for holding a bag in stringing position, an abutment plate at each side of the supported bag, a pair of reciprocatory needles movable across the space between the abutment plates and through the bag to thread a first drawstring therethrough in one of their directions of movement and to thread a second drawstring therethrough in their reverse direction of movement, each of said needles having a front eye and a rear eye, devices movable transversely of the respective abutment plates to respectively thread the front and rear eyes of the needles with string from supply strings, devices cooperating with each abutment plate for clamping the string first against one abutment and then against the other abutment, means to pull out the string between and after said clamping periods to form drawstring portions, means for severing the drawstring portions, means for reciprocating the needles, and means for actuating the string pulling means in a direction parallel to the direction of movement of the stringing needles.

18. In a bag stringing machine, supporting means for holding a bag in stringing position, an abutment plate at each side of the supported bag, a pair of parallel reciprocatory needles movable across the space between the abutment plates and through the bag to thread a first drawstring therethrough in one of their directions of movement and to thread a second drawstring therethrough in their reverse direction of movement, each of said needles having a front eye and a rear eye, devices movable across the respective abutment plates to respectively thread the front and rear eyes of the needles with string from supply strings, means cooperating with each abutment plate for clamping the string first against one abutment and then against the other abutment, means to pull out the string between and after said clamping periods to form drawstring portions, means for severing the drawstring portions, means for reciprocating the needles, and means for actuating said clamping means in a direction at right angles to the plane of the stringing needles.

19. In a bag stringing machine for bags having hems at their mouth ends, a pair of main needles for inserting two drawstrings in opposite directions through the hems, each needle having a front eye and a rear eye, means for successively threading the front and rear eyes of the needles from string supply sources and forming drawstrings therefrom, and means for actuating the needles to thread the drawstrings through the bag hems, said needle threading means comprising needles reciprocable at right angles to the main needles and having transverse eyes loosely carrying the thread to be inserted.

20. In a bag stringing machine, needle means for threading a bag, a fixed clamping abutment, means for threading the needle means from a supply string, a clamping member mounted independent of the needle means for clamping the string at one end of a drawstring portion to be formed against the clamping abutment, means for pulling out the supply string to form a drawstring portion, a second clamping member mounted independent of the needle means for clamping another portion of the supply string against the abutment, means for severing the drawstring portion from the supply string, means for operating the needle means, and means for actuating said clamping members.

21. A bag drawstringing machine including a fixed abutment, a pair of parallel stringing needles movable over the abutment, means for passing a supply thread through the eyes of the needles, means for clamping the thread at one end of a drawstring portion to be formed against the abutment and leaving the remainder of the thread free to be drawn out, means for drawing out the thread to form a measured drawstring portion, means for clamping another portion of the thread against said abutment, means for severing the drawstring from the supply thread, and means for operating the needles to thread the so formed drawstring through the bag.

22. In a bag stringing machine, supporting means for holding a bag in stringing position, a fixed abutment at each side of the supported bag, a pair of reciprocatory needles movable across the space between the abutments and through the bag to thread a first drawstring therethrough in one of their directions of movement and to thread a second drawstring therethrough in their reverse direction of movement, each of said needles having a front eye and a rear eye, devices movable transversely of the respective abutments to respectively thread the front and rear eyes of the needles with string from supply strings, devices cooperating with each abutment for clamping the string first against one abutment and then against the other abutment, means to pull out the string between and after said clamping periods to form drawstring portions, means for severing the drawstring portions, and means for reciprocating the needles.

23. In a bag stringing machine, supporting means for holding a bag in stringing position, an abutment at each side of the supported bag, a pair of parallel reciprocatory needles movable across the space between the abutments and through the bag to thread a first drawstring therethrough in one of their directions of movement and to thread a second drawstring therethrough in their reverse direction of movement, each of said needles having a front eye and a rear eye, devices movable across the respective abutments to respectively thread the front and rear eyes of the needles with string from supply strings, means cooperating with each abutment for clamping the string first against one abutment and then against the other abutment, means to pull out the string between and after said clamping periods to form drawstring portions, means for severing the drawstring portions, and means for reciprocating the needles.

24. In a bag stringing machine, a pair of parallel stringing needles each having an eye portion, needle threading means adapted to pass transversely through said eyes for supplying drawstring thereto, means independent of the needles for clamping the free end of the supply thread leaving the remainder free to be drawn out, means for drawing out the thread to form a measured drawstring portion; a second clamping means independent of the needles for clamping another portion of the supply thread at a point intermediate the needles, means for drawing out an additional drawstring portion after the operation of the second clamping means, and means for severing the formed drawstring from the source of supply.

25. A bag stringing and knotting machine, comprising means for supporting a bag to be strung in stringing position, means for passing a looped drawstring through the bag hem leaving the free ends projecting beyond the bag, resilient clamping means for yieldingly supporting the free ends of the bag strings, and means for knotting the drawstring while the said free ends are yieldingly supported.

26. In a bag stringing machine, in combination with a pair of bag stringing needles adapted to be reciprocated between a pair of stations between which a bag to be strung is supported, each station including needle threading means, and drawstring clamping means coacting therewith and comprising fixed and movable clamping members, means for reciprocating the needles between the two stations to string the bag, said needle threading means at each station comprising a thread carrying rod adapted to be reciprocated at right angles to the direction of movement of the stringing needles and toward and away from the drawstring clamping means, and means for actuating the movable clamping member in a rectilinear path at right angles to the direction of movement of said stringing needles to clamp the drawstring against the fixed clamping member.

27. In a bag stringing machine, in combination with a pair of bag stringing needles adapted to be reciprocated between a pair of stations between which a bag to be strung is supported, each station including needle threading means, drawstring clamping means coacting with the threading needles and comprising fixed and movable clamping members, and drawstring measuring means, means for reciprocating the needles between the two stations to string the bag, said needle threading means at each station comprising thread carrying rods adapted to reciprocate at right angles to the direction of movement of the stringing needles, means for actuating the movable clamping member in a rectilinear path perpendicular to the plane of movement of the stringing needles, and means for reciprocating the measuring means in a direction parallel to the direction of movement of the bag stringing needles.

28. In a bag stringing machine, reciprocating needle means for threading a bag, means for threading the needle means from a supply of string, a fixed clamping abutment, a drawstring clamping member having a supporting member passing through the abutment at right angles to the direction of movement of the needle means, means for reciprocating said clamping member for clamping the string at one end of a drawstring to be formed against the clamping abutment, and means for pulling out the string to form a drawstring portion.

29. In a bag stringing machine, reciprocating needle means for threading a bag, means for threading the needle means from a supply of string, a fixed clamping abutment, a drawstring clamping member having a supporting member passing through the abutment at right angles to the direction of movement of the needle means, means for reciprocating said clamping means for clamping the string at one end of a drawstring to be formed against the clamping abutment, means for pulling out the string to form a drawstring portion, and means for actuating said pulling means in a direction parallel to the direction of movement of the needle means.

30. In a bag stringing machine, reciprocating needle means for threading a bag, means for threading the needle means from a supply string, a fixed clamping abutment, a drawstring clamping member having a supporting member passing through the abutment at right angles to the direction of movement of the needle means for clamping the string at one end of a drawstring to be formed against the clamping abutment, means for pulling out the string to form a drawstring portion, a second clamping member for clamping the drawstring at its center against the fixed abutment so that the ends will match after being drawn through the bag, and a second pulling means for forming another drawstring portion.

31. In a device of the character described, in combination with reciprocable drawstring carrying needles and a drawstring knotter, means for engaging the ends of the drawstring carried by the needles and transferring them to a position where the drawstring is releasably supported in the path of the knotter, said means comprising a tubular member located adjacent the knotter and in the path of the needles carrying the drawstring, said tubular member being transversely slotted to permit passage of the needles therethrough and having means at one end thereof for yieldingly clamping the loose drawstring ends when delivered thereto, and means comprising a rod reciprocable in the tubular member for delivering the drawstring ends to the yielding clamping means.

32. In a device of the character described, in combination with reciprocating drawstring carrying needles and a drawstring knotter; a drawstring clamping and lifting device comprising a tubular member located adjacent the knotter and in the path of the needles carrying the drawstring loosely therein, said tubular member being slotted to permit the needles to pass therethrough and having a thread clamping head including a yielding thread gripping portion, and means for lifting the ends of the drawstring from the needles and delivering the same to said clamping head, said lifting means comprising a rod reciprocable in the tubular member, the drawstring knotting means located adjacent said lifting and clamping device and being adapted to engage the drawstring while releasably supported thereby, and to form a knot therein.

BERTIE C. GOLDEN.

REFERENCES CITED

The following references are of record in the file of this patent:

UNITED STATES PATENTS

| Number | Name | Date |
|---|---|---|
| 2,274,622 | West | Feb. 24, 1942 |
| 2,296,783 | Golden | Sept. 22, 1942 |

FOREIGN PATENTS

| Number | Country | Date |
|---|---|---|
| 3,471 | Great Britain | of 1871 |